United States Patent
Fu et al.

(10) Patent No.: US 12,436,915 B2
(45) Date of Patent: Oct. 7, 2025

(54) OPERATING A COST ESTIMATION TOOL FOR PLACING AND ROUTING AN OPERATION UNIT GRAPH ON A RECONFIGURABLE PROCESSOR

(71) Applicant: SambaNova Systems, Inc., Palo Alto, CA (US)

(72) Inventors: Yue Fu, Palo Alto, CA (US); Kin Hing Leung, Cupertino, CA (US); Likun Hao, Palo Alto, CA (US); Arvind Krishna Sujeeth, Palo Alto, CA (US); Sumti Jairath, Palo Alto, CA (US); Andrew Deng, San Jose, CA (US); Raghu Prabhakar, San Jose, CA (US)

(73) Assignee: SambaNova Systems, Inc., Palo Alta, CA (US)

( * ) Notice: Subject to any disclaimer, the term of this patent is extended or adjusted under 35 U.S.C. 154(b) by 181 days.

(21) Appl. No.: 18/221,685

(22) Filed: Jul. 13, 2023

(65) Prior Publication Data
US 2024/0020265 A1 Jan. 18, 2024

Related U.S. Application Data

(60) Provisional application No. 63/388,915, filed on Jul. 13, 2022.

(51) Int. Cl.
*G06F 15/78* (2006.01)
*G06F 9/50* (2006.01)
*G06F 13/40* (2006.01)

(52) U.S. Cl.
CPC ........ *G06F 15/7871* (2013.01); *G06F 9/5044* (2013.01); *G06F 13/4063* (2013.01)

(58) Field of Classification Search
CPC . G06F 15/7871; G06F 9/5044; G06F 13/4063
See application file for complete search history.

(56) References Cited

U.S. PATENT DOCUMENTS 6,594,773 B1 7/2003 Lisitsa et al.
7,434,191 B2 10/2008 Vorbach et al.
(Continued)

FOREIGN PATENT DOCUMENTS

WO 2010142987 A1 12/2010

OTHER PUBLICATIONS

Koeplinger et al., Spatial: A Language and Compiler for Application Accelerators, PLDI '18, Jun. 18-22, 2018, Association for Computng Machinery, 16 pages.
(Continued)

*Primary Examiner* — Henry Tsai
*Assistant Examiner* — Aurangzeb Hassan
(74) *Attorney, Agent, or Firm* — Flagship Patents; Sikander M. Khan; Joachim Pistorius

(57) ABSTRACT

A system with a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor is presented as well as a method of operating such a cost estimation tool and a non-transitory computer-readable storage medium including instructions that, when executed by a processing unit, cause the processing unit to operate such a cost estimation tool The cost estimation tool may be configured to determine the realized bandwidth consumption of the tentative assignment based on an upper bandwidth limit of the logical edge, an end-to-end bandwidth, a scaling factor of a realized bandwidth, and a congestion estimation of the physical link.

19 Claims, 10 Drawing Sheets

(56) References Cited

U.S. PATENT DOCUMENTS

| | | | |
|---|---|---|---|
| 9,280,326 | B1 | 3/2016 | Braun et al. |
| 11,037,050 | B2* | 6/2021 | Vinod .................... G06N 3/045 |
| 11,093,223 | B2 | 8/2021 | Rabinovitch |
| 11,126,574 | B1 | 9/2021 | Prabhakar et al. |
| 11,948,017 | B2* | 4/2024 | Venkatesh ................ G06T 1/20 |
| 2004/0006584 | A1 | 1/2004 | Vandeweerd |
| 2009/0172351 | A1* | 7/2009 | Vorbach ............ G06F 15/17343 |
| | | | 712/E9.034 |
| 2011/0238948 | A1 | 9/2011 | Vorbach et al. |
| 2014/0064096 | A1 | 3/2014 | Stevens et al. |
| 2017/0123794 | A1* | 5/2017 | Chen .................... G06F 9/3858 |
| 2020/0272444 | A1 | 8/2020 | Nilsen |
| 2021/0208886 | A1 | 7/2021 | Nilsen |
| 2021/0248115 | A1* | 8/2021 | Jones .................... G06F 9/5038 |
| 2022/0300450 | A1 | 9/2022 | Pope et al. |
| 2023/0051544 | A1* | 2/2023 | Vanesko ............... G06F 9/3867 |
| 2023/0153142 | A1 | 5/2023 | Shabah et al. |
| 2023/0315608 | A1 | 10/2023 | Kim |

OTHER PUBLICATIONS

M. Emani et al., Accelerating Scientific Applications With Sambanova Reconfigurable Dataflow Architecture, in Computing in Science & Engineering, vol. 23, No. 2, pp. 114-119, Mar. 26, 2021, [doi: 10.1109/MCSE.2021.3057203].

Podobas et al, A Survey on Coarse-Grained Reconfigurable Architectures From a Performance Perspective, IEEEAccess, vol. 2020. 3012084, Jul. 27, 2020, 25 pages.

Prabhakar et al., Plasticine: A Reconfigurable Architecture for Parallel Patterns, ISCA, Jun. 24-28, 2017, 14 pages.

U.S. Appl. No. 16/239,252 Final Office Action, dated Jan. 8, 2020, 13 pages.

U.S. Appl. No. 16/239,252—Notice of Allowance dated Feb. 12, 2020, 10 pages.

U.S. Appl. No. 16/239,252—Office Action dated Aug. 7, 2019, 8 pages.

U.S. Appl. No. 16/239,252—Response to Final Office Action dated Jan. 8, 2020, filed Jan. 24, 2020, 14 pages.

U.S. Appl. No. 16/239,252—Response to Office Action dated Aug. 7, 2019, filed Sep. 26, 2019, 6 pages.

U.S. Appl. No. 17/216,651 Notice of Allowance, dated Aug. 5, 2021, 14 pages.

U.S. Appl. No. 17/216,651 Response to First Office Action, dated Jul. 13, 2021, filed Jul. 23, 2021, 14 pages.

U.S. Appl. No. 17/216,652 Non-Final Rejection, dated Aug. 2, 2021, 24 pages.

U.S. Appl. No. 16/239,252—Notice of Allowance dated May 14, 2020, 15 pages.

U.S. Appl. No. 16/922,975—Final Office Action, dated Mar. 9, 2023, 23 pages.

U.S. Appl. No. 16/922,975—Non-Final Office Action, dated Oct. 27, 2022, 26 pages.

U.S. Appl. No. 16/922,975—Notice of Allowance, dated Jul. 3, 2023, 11 pages.

U.S. Appl. No. 17/216,651—Non-Final Rejection, dated Jul. 13, 2021, 12 pages.

* cited by examiner

OPERATING A COST ESTIMATION TOOL FOR PLACING AND ROUTING AN OPERATION UNIT GRAPH ON A RECONFIGURABLE PROCESSOR

RELATED APPLICATIONS AND DOCUMENTS

This application claims the benefit of U.S. Provisional Patent Application No. 63/388,915, entitled, "Cost Model: Each graph annotated with bandwidth requirements; cost minimization over the graph" filed on 13 Jul. 2022. The provisional application is hereby incorporated by reference for all purposes.

This application also is related to the following papers and commonly owned applications:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," Proceedings Of The 39th ACM SIGPLAN Conference On Programming Language Design And Embodiment (PLDI), Proceedings of the 43rd International Symposium on Computer Architecture, 2018;

U.S. Nonprovisional patent application Ser. No. 16/239, 252, now U.S. Pat. No. 10,698,853 B1, filed Jan. 3, 2019, entitled "VIRTUALIZATION OF A RECONFIGURABLE DATA PROCESSOR;"

U.S. Nonprovisional patent application Ser. No. 16/862, 445, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 16/197, 826, now U.S. Pat. No. 10,831,507 B2, filed Nov. 21, 2018, entitled "CONFIGURATION LOAD OF A RECONFIGURABLE DATA PROCESSOR;"

U.S. Nonprovisional patent application Ser. No. 16/198, 086, now U.S. Pat. No. 11,188,497 B2, filed Nov. 21, 2018, entitled "CONFIGURATION UNLOAD OF A RECONFIGURABLE DATA PROCESSOR;"

U.S. Nonprovisional patent application Ser. No. 17/093, 543, filed Nov. 9, 2020, entitled "EFFICIENT CONFIGURATION OF A RECONFIGURABLE DATA PROCESSOR;"

U.S. Nonprovisional patent application Ser. No. 16/260, 548, now U.S. Pat. No. 10,768,899 B2, filed Jan. 29, 2019, entitled "MATRIX NORMAL/TRANSPOSE READ AND A RECONFIGURABLE DATA PROCESSOR INCLUDING SAME;"

U.S. Nonprovisional patent application Ser. No. 16/536, 192, now U.S. Pat. No. 11,080,227 B2, filed Aug. 8, 2019, entitled "COMPILER FLOW LOGIC FOR RECONFIGURABLE ARCHITECTURES;"

U.S. Nonprovisional patent application Ser. No. 17/326, 128, filed May 20, 2021, entitled "COMPILER FLOW LOGIC FOR RECONFIGURABLE ARCHITECTURES;"

U.S. Nonprovisional patent application Ser. No. 16/407, 675, now U.S. Pat. No. 11,386,038 B2, filed May 9, 2019, entitled "CONTROL FLOW BARRIER AND RECONFIGURABLE DATA PROCESSOR;"

U.S. Nonprovisional patent application Ser. No. 16/504, 627, now U.S. Pat. No. 11,055,141 B2, filed Jul. 8, 2019, entitled "QUIESCE RECONFIGURABLE DATA PROCESSOR;"

U.S. Nonprovisional patent application Ser. No. 17/322, 697, filed May 17, 2021, entitled "QUIESCE RECONFIGURABLE DATA PROCESSOR;"

U.S. Nonprovisional patent application Ser. No. 16/572, 516, filed Sep. 16, 2019, entitled "EFFICIENT EXECUTION OF OPERATION UNIT GRAPHS ON RECONFIGURABLE ARCHITECTURES BASED ON USER SPECIFICATION;"

U.S. Nonprovisional patent application Ser. No. 16/744, 077, filed Jan. 15, 2020, entitled "COMPUTATIONALLY EFFICIENT SOFTMAX LOSS GRADIENT BACKPROPAGATION;"

U.S. Nonprovisional patent application Ser. No. 16/590, 058, now U.S. Pat. No. 11,327,713 B2, filed Oct. 1, 2019, entitled "COMPUTATION UNITS FOR FUNCTIONS BASED ON LOOKUP TABLES;"

U.S. Nonprovisional patent application Ser. No. 16/695, 138, now U.S. Pat. No. 11,328,038 B2, filed Nov. 25, 2019, entitled "COMPUTATIONAL UNITS FOR BATCH NORMALIZATION;"

U.S. Nonprovisional patent application Ser. No. 16/688, 069, filed Nov. 19, 2019, now U.S. Pat. No. 11,327,717 B2, entitled "LOOK-UP TABLE WITH INPUT OFFSETTING;"

U.S. Nonprovisional patent application Ser. No. 16/718, 094, filed Dec. 17, 2019, now U.S. Pat. No. 11,150,872 B2, entitled "COMPUTATIONAL UNITS FOR ELEMENT APPROXIMATION;"

U.S. Nonprovisional patent application Ser. No. 16/560, 057, now U.S. Pat. No. 11,327,923 B2, filed Sep. 4, 2019, entitled "SIGMOID FUNCTION IN HARDWARE AND A RECONFIGURABLE DATA PROCESSOR INCLUDING SAME;"

U.S. Nonprovisional patent application Ser. No. 16/572, 527, now U.S. Pat. No. 11,410,027 B2, filed Sep. 16, 2019, entitled "Performance Estimation-Based Resource Allocation for Reconfigurable Architectures;"

U.S. Nonprovisional patent application Ser. No. 15/930, 381, now U.S. Pat. No. 11,250,105 B2, filed May 12, 2020, entitled "COMPUTATIONALLY EFFICIENT GENERAL MATRIX-MATRIX MULTIPLICATION (GEMM);"

U.S. Nonprovisional patent application Ser. No. 17/337, 080, now U.S. Pat. No. 11,328,209 B1, filed Jun. 2, 2021, entitled "MEMORY EFFICIENT DROPOUT;"

U.S. Nonprovisional patent application Ser. No. 17/337, 126, now U.S. Pat. No. 11,256,987 B1, filed Jun. 2, 2021, entitled "MEMORY EFFICIENT DROPOUT, WITH REORDERING OF DROPOUT MASK ELEMENTS;"

U.S. Nonprovisional patent application Ser. No. 16/890, 841, filed Jun. 2, 2020, entitled "ANTI-CONGESTION FLOW CONTROL FOR RECONFIGURABLE PROCESSORS;"

U.S. Nonprovisional patent application Ser. No. 17/023, 015, now U.S. Pat. No. 11,237,971 B1, filed Sep. 16, 2020, entitled "COMPILE TIME LOGIC FOR DETECTING STREAMING COMPATIBLE AND BROADCAST COMPATIBLE DATA ACCESS PATTERNS;"

U.S. Nonprovisional patent application Ser. No. 17/031, 679, filed Sep. 24, 2020, entitled "SYSTEMS AND METHODS FOR MEMORY LAYOUT DETERMINATION AND CONFLICT RESOLUTION;"

U.S. Nonprovisional patent application Ser. No. 17/175, 289, now U.S. Pat. No. 11,126,574 B1, filed Feb. 12, 2021, entitled "INSTRUMENTATION PROFILING FOR RECONFIGURABLE PROCESSORS;"

U.S. Nonprovisional patent application Ser. No. 17/371, 049, filed Jul. 8, 2021, entitled "SYSTEMS AND METHODS FOR EDITING TOPOLOGY OF A RECONFIGURABLE DATA PROCESSOR;"

U.S. Nonprovisional patent application Ser. No. 16/922, 975, filed Jul. 7, 2020, entitled "RUNTIME VIRTUALIZATION OF RECONFIGURABLE DATA FLOW RESOURCES;"

U.S. Nonprovisional patent application Ser. No. 16/996, 666, filed Aug. 18, 2020, entitled "RUNTIME PATCHING OF CONFIGURATION FILES;"

U.S. Nonprovisional patent application Ser. No. 17/214, 768, now U.S. Pat. No. 11,200,096 B1, filed Mar. 26, 2021, entitled "RESOURCE ALLOCATION FOR RECONFIGURABLE PROCESSORS;"

U.S. Nonprovisional patent application Ser. No. 17/127, 818, now U.S. Pat. No. 11,182,264 B1, filed Dec. 18, 2020, entitled "INTRA-NODE BUFFER-BASED STREAMING FOR RECONFIGURABLE PROCESSOR-AS-A-SERVICE (RPAAS);"

U.S. Nonprovisional patent application Ser. No. 17/127, 929, now U.S. Pat. No. 11,182,221 B1, filed Dec. 18, 2020, entitled "INTER-NODE BUFFER-BASED STREAMING FOR RECONFIGURABLE PROCESSOR-AS-A-SERVICE (RPAAS);"

U.S. Nonprovisional patent application Ser. No. 17/185, 264, filed Feb. 25, 2021, entitled "TIME-MULTIPLEXED USE OF RECONFIGURABLE HARDWARE;"

U.S. Nonprovisional patent application Ser. No. 17/216, 647, now U.S. Pat. No. 11,204,889 B1, filed Mar. 29, 2021, entitled "TENSOR PARTITIONING AND PARTITION ACCESS ORDER;"

U.S. Nonprovisional patent application Ser. No. 17/216, 650, now U.S. Pat. No. 11,366,783 B1, filed Mar. 29, 2021, entitled "MULTI-HEADED MULTI-BUFFER FOR BUFFERING DATA FOR PROCESSING;"

U.S. Nonprovisional patent application Ser. No. 17/216, 657, now U.S. Pat. No. 11,263,170 B1, filed Mar. 29, 2021, entitled "LOSSLESS TILING IN CONVOLUTION NETWORKS-PADDING BEFORE TILING, LOCATION-BASED TILING, AND ZEROING-OUT;"

U.S. Nonprovisional patent application Ser. No. 17/384, 515, filed Jul. 23, 2021, entitled "LOSSLESS TILING IN CONVOLUTION NETWORKS—MATERIALIZATION OF TENSORS;"

U.S. Nonprovisional patent application Ser. No. 17/216, 651, now U.S. Pat. No. 11,195,080 B1, filed Mar. 29, 2021, entitled "LOSSLESS TILING IN CONVOLUTION NETWORKS-TILING CONFIGURATION;"

U.S. Nonprovisional patent application Ser. No. 17/216, 652, now U.S. Pat. No. 11,227,207 B1, filed Mar. 29, 2021, entitled "LOSSLESS TILING IN CONVOLUTION NETWORKS-SECTION BOUNDARIES;"

U.S. Nonprovisional patent application Ser. No. 17/216, 654, now U.S. Pat. No. 11,250,061 B1, filed Mar. 29, 2021, entitled "LOSSLESS TILING IN CONVOLUTION NETWORKS-READ-MODIFY-WRITE IN BACKWARD PASS;"

U.S. Nonprovisional patent application Ser. No. 17/216, 655, now U.S. Pat. No. 11,232,360 B1, filed Mar. 29, 2021, entitled "LOSSLESS TILING IN CONVOLUTION NETWORKS-WEIGHT GRADIENT CALCULATION;"

U.S. Nonprovisional patent application Ser. No. 17/364, 110, filed Jun. 30, 2021, entitled "LOSSLESS TILING IN CONVOLUTION NETWORKS—TILING CONFIGURATION FOR A SEQUENCE OF SECTIONS OF A GRAPH;"

U.S. Nonprovisional patent application Ser. No. 17/364, 129, filed Jun. 30, 2021, entitled "LOSSLESS TILING IN CONVOLUTION NETWORKS—TILING CONFIGURATION BETWEEN TWO SECTIONS;"

"U.S. Nonprovisional patent application Ser. No. 17/364, 141, filed Jun. 30, 2021, entitled ""LOSSLESS TILING IN CONVOLUTION NETWORKS—PADDING AND RE-TILLING AT SECTION BOUNDARIES;"

U.S. Nonprovisional patent application Ser. No. 17/384, 507, filed Jul. 23, 2021, entitled "LOSSLESS TILING IN CONVOLUTION NETWORKS— BACKWARD PASS;"

U.S. Provisional Patent Application No. 63/107,413, filed Oct. 29, 2020, entitled "SCANNABLE LATCH ARRAY FOR STRUCTURAL TEST AND SILICON DEBUG VIA SCANDUMP;"

U.S. Provisional Patent Application No. 63/165,073, filed Mar. 23, 2021, entitled "FLOATING POINT MULTIPLY-ADD, ACCUMULATE UNIT WITH CARRY-SAVE ACCUMULATOR IN BF16 AND FLP32 FORMAT;"

U.S. Provisional Patent Application No. 63/166,221, filed Mar. 25, 2021, entitled "LEADING ZERO AND LEADING ONE DETECTOR PREDICTOR SUITABLE FOR CARRY-SAVE FORMAT;"

U.S. Provisional Patent Application No. 63/174,460, filed Apr. 13, 2021, entitled "EXCEPTION PROCESSING IN CARRY-SAVE ACCUMULATION UNIT FOR MACHINE LEARNING;"

U.S. Nonprovisional patent application Ser. No. 17/397, 241, now U.S. Pat. No. 11,429,349 B1, filed Aug. 9, 2021, entitled "FLOATING POINT MULTIPLY-ADD, ACCUMULATE UNIT WITH CARRY-SAVE ACCUMULATOR;"

U.S. Nonprovisional patent application Ser. No. 17/216, 509, now U.S. Pat. No. 11,191,182 B1, filed Mar. 29, 2021, entitled "UNIVERSAL RAIL KIT;"

U.S. Nonprovisional patent application Ser. No. 17/379, 921, now U.S. Pat. No. 11,392,740 B2, filed Jul. 19, 2021, entitled "DATAFLOW FUNCTION OFFLOAD TO RECONFIGURABLE PROCESSORS;"

U.S. Nonprovisional patent application Ser. No. 17/379, 924, now U.S. Pat. No. 11,237,880 B1, filed Jul. 19, 2021, entitled "DATAFLOW ALL-REDUCE FOR RECONFIGURABLE PROCESSOR SYSTEMS;"

U.S. Nonprovisional patent application Ser. No. 17/378, 342, now U.S. Pat. No. 11,556,494 B1, filed Jul. 16, 2021, entitled "DEFECT REPAIR FOR A RECONFIGURABLE DATA PROCESSOR;"

U.S. Nonprovisional patent application Ser. No. 17/378, 391, now U.S. Pat. No. 11,327,771 B1, filed Jul. 16, 2021, entitled "DEFECT REPAIR CIRCUITS FOR A RECONFIGURABLE DATA PROCESSOR;"

U.S. Nonprovisional patent application Ser. No. 17/378, 399, now U.S. Pat. No. 11,409,540 B1, filed Jul. 16, 2021, entitled "ROUTING CIRCUITS FOR DEFECT REPAIR FOR A RECONFIGURABLE DATA PROCESSOR;"

U.S. Provisional Patent Application No. 63/220,266, filed Jul. 9, 2021, entitled "LOGIC BIST AND FUNCTIONAL TEST FOR A CGRA;" U.S. Provisional Patent Application No. 63/195,664, filed Jun. 1, 2021, entitled "VARIATION-TOLERANT VARIABLE-LENGTH CLOCK-STRETCHER MODULE WITH IN-SITU END-OF-CHAIN DETECTION MECHANISM;"

U.S. Nonprovisional patent application Ser. No. 17/338,620, now U.S. Pat. No. 11,323,124 B1, filed Jun. 3, 2021, entitled "VARIABLE-LENGTH CLOCK STRETCHER WITH CORRECTION FOR GLITCHES DUE TO FINITE DLL BANDWIDTH;"

U.S. Nonprovisional patent application Ser. No. 17/338,625, now U.S. Pat. No. 11,239,846 B1, filed Jun. 3, 2021, entitled "VARIABLE-LENGTH CLOCK STRETCHER WITH CORRECTION FOR GLITCHES DUE TO PHASE DETECTOR OFFSET;"

U.S. Nonprovisional patent application Ser. No. 17/338,626, now U.S. Pat. No. 11,290,113 B1, filed Jun. 3, 2021, entitled "VARIABLE-LENGTH CLOCK STRETCHER WITH CORRECTION FOR DIGITAL DLL GLITCHES;"

U.S. Nonprovisional patent application Ser. No. 17/338,629, now U.S. Pat. No. 11,290,114 B1, filed Jun. 3, 2021, entitled "VARIABLE-LENGTH CLOCK STRETCHER WITH PASSIVE MODE JITTER REDUCTION;"

U.S. Nonprovisional patent application Ser. No. 17/405,913, now U.S. Pat. No. 11,334,109 B1, filed Aug. 18, 2021, entitled "VARIABLE-LENGTH CLOCK STRETCHER WITH COMBINER TIMING LOGIC;"

U.S. Provisional Patent Application No. 63/230,782, filed Aug. 8, 2021, entitled "LOW-LATENCY MASTER-SLAVE CLOCKED STORAGE ELEMENT;"

U.S. Provisional Patent Application No. 63/236,218, filed Aug. 23, 2021, entitled "SWITCH FOR A RECONFIGURABLE DATAFLOW PROCESSOR;"

U.S. Provisional Patent Application No. 63/236,214, filed Aug. 23, 2021, entitled "SPARSE MATRIX MULTIPLIER;"

U.S. Provisional Patent Application No. 63/389,767, filed Jul. 15, 2022. entitled "PEER-TO-PEER COMMUNICATION BETWEEN RECONFIGURABLE DATAFLOW UNITS;"

U.S. Provisional Patent Application No. 63/405,240, filed Sep. 9, 2022, entitled "PEER-TO-PEER ROUTE THROUGH IN A RECONFIGURABLE COMPUTING SYSTEM."

All of the related application(s) and documents listed above are hereby incorporated by reference herein for all purposes.

FIELD OF THE TECHNOLOGY DISCLOSED

The present technology relates to a cost estimation tool, and more particularly, to a system comprising a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor. Furthermore, the present technology relates to a method of operating a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor, and to a non-transitory computer-readable storage medium including instructions that, when executed by a processing unit, cause the processing unit to operate a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including FPGAs, can be configured to implement a variety of functions more efficiently or faster than might be achieved using a general-purpose processor executing a computer program. So-called coarse-grained reconfigurable architectures (CGRAs) are being developed in which the configurable units in the array are more complex than used in typical, more fine-grained FPGAs, and may enable faster or more efficient execution of various classes of functions. For example, CGRAs have been proposed that can enable implementation of low-latency and energy-efficient accelerators for machine learning and artificial intelligence workloads.

With the rapid expansion of applications that can be characterized by dataflow processing, such as natural-language processing and recommendation engines, the performance and efficiency challenges of traditional, instruction set architectures have become apparent. First, the sizable, generation-to-generation performance gains for multicore processors have tapered off. As a result, developers can no longer depend on traditional performance improvements to power more complex and sophisticated applications. This holds true for both CPU fat-core and GPU thin-core architectures.

A new approach is required to extract more useful work from current semiconductor technologies. Amplifying the gap between required and available computing is the explosion in the use of deep learning. According to a study by OpenAl, during the period between 2012 and 2020, the compute power used for notable artificial intelligence achievements has doubled every 3.4 months.

It is common for GPUs to be used for training and CPUs to be used for inference in machine learning systems based on their different characteristics. Many real-life systems demonstrate continual and sometimes unpredictable change, which means predictive accuracy of models declines without frequent updates.

Finally, while the performance challenges are acute for machine learning, other workloads such as analytics, scientific applications and even SQL data processing all could benefit from dataflow processing. New approaches should be flexible enough to support broader workloads and facilitate the convergence of machine learning and high-performance computing or machine learning and business applications.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

DETAILED DESCRIPTION

Figure 1:
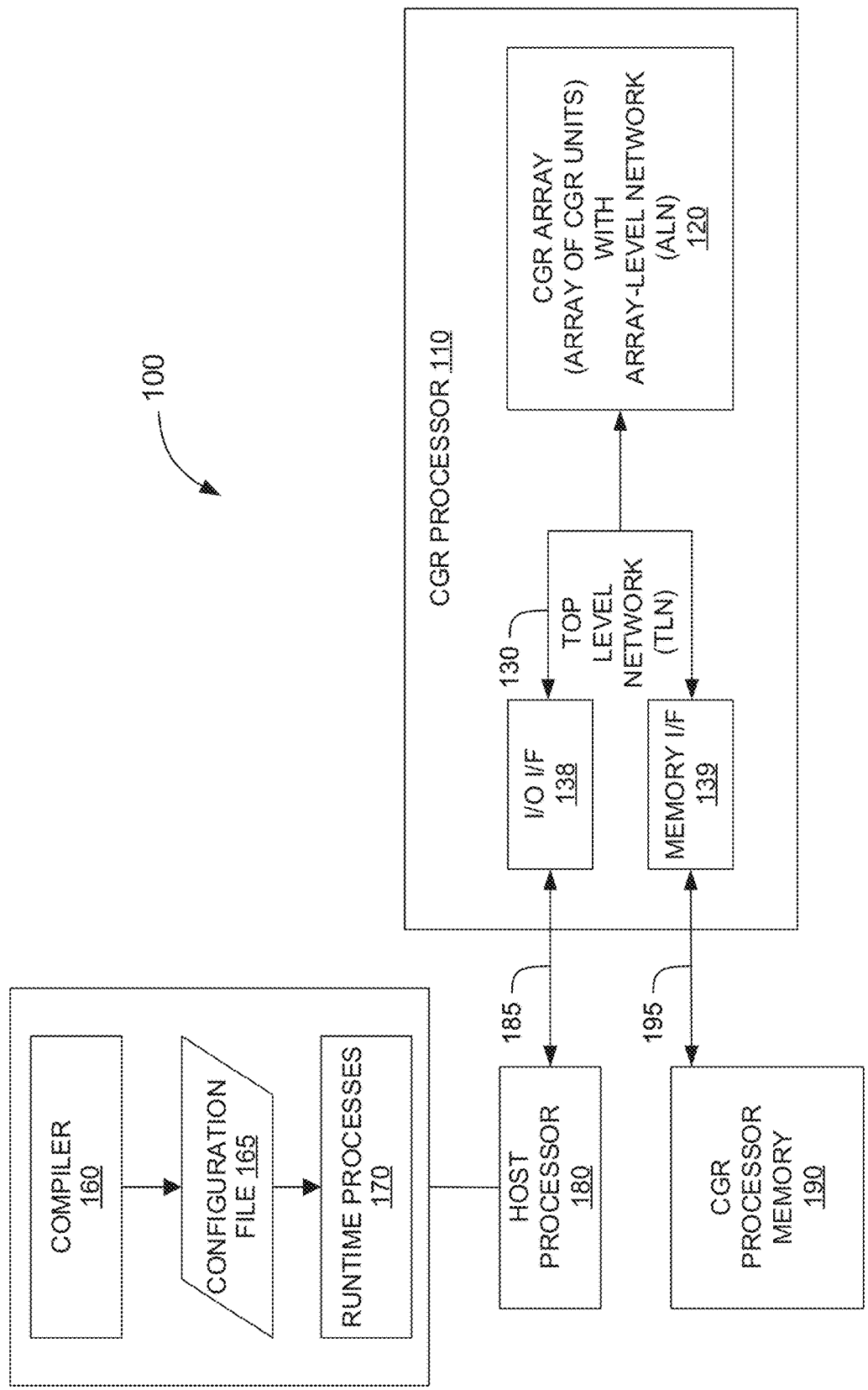
FIG. 1 is a diagram of an illustrative data processing system including a coarse-grained reconfigurable (CGR) processor, CGR processor memory, and a host processor.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Traditional compilers translate human-readable computer source code into machine code that can be executed on a Von Neumann computer architecture. In this architecture, a processor serially executes instructions in one or more threads of software code. The architecture is static and the compiler does not determine how execution of the instructions is pipelined, or which processor or memory takes care of which thread. Thread execution is asynchronous, and safe exchange of data between parallel threads is not supported.

Applications for machine learning (ML) and artificial intelligence (AI) may require massively parallel computations, where many parallel and interdependent threads (metapipelines) exchange data. Therefore, such applications are ill-suited for execution on Von Neumann computers. They require architectures that are adapted for parallel processing, such as coarse-grained reconfigurable (CGR) architectures (CGRAs) or graphic processing units (GPUs).

The ascent of ML, AI, and massively parallel architectures places new requirements on compilers. Reconfigurable processors, and especially CGRAs, often include specialized hardware elements such as compute units and memory units that operate in conjunction with one or more software elements such as a host processor and attached host memory, and are particularly efficient for implementing and executing highly-parallel applications such as machine learning applications.

Thus, such compilers are required to pipeline computation graphs, or dataflow graphs, decide which operations of an operation unit graph are assigned to which portions of the reconfigurable processor, how data is routed between various compute units and memory units, and how synchronization is controlled, particularly when a dataflow graph includes one or more nested loops, whose execution time varies dependent on the data being processed.

In this context, it is particularly important for the compiler to perform hardware resource allocation during placement and routing such that the performance of a dataflow graph implementation on a given reconfigurable processor is optimized while the implementation optimizes the utilization rate of the reconfigurable processor's hardware resources.

Therefore, it is desirable to provide a new cost estimation tool and a method of operation such a cost estimation tool that is particularly suited for guiding the compiler during the compilation of highly-parallel applications for achieving a high-performance implementation of the highly-parallel applications on a given reconfigurable processor. The new cost estimation tool should provide a correct estimation of the actual cost of implementing an application or portions of an application on the given reconfigurable processor during the execution of placement and routing operations. The new cost estimation tool should further use few compute resources and be able to provide such an estimation in a short period of time.

FIG. 1 illustrates an example data processing system 100 including a host processor 180, a reconfigurable processor such as a coarse-grained reconfigurable (CGR) processor 110, and an attached CGR processor memory 190. As shown, CGR processor 110 has a coarse-grained reconfigurable architecture (CGRA) and includes an array of CGR units 120 such as a CGR array. CGR processor 110 may include an input-output (I/O) interface 138 and a memory interface 139. Array of CGR units 120 may be coupled with (I/O) interface 138 and memory interface 139 via databus 130 which may be part of a top-level network (TLN). Host processor 180 communicates with I/O interface 138 via system databus 185, which may be a local bus as described hereinafter, and memory interface 139 communicates with attached CGR processor memory 190 via memory bus 195.

Array of CGR units 120 may further include compute units and memory units that are interconnected with an array-level network (ALN) to provide the circuitry for execution of a computation graph or a data flow graph that may have been derived from a high-level program with user algorithms and functions. A high-level program is source code written in programming languages like Spatial, Python, C++, and C. The high-level program and referenced libraries can implement computing structures and algorithms of machine learning models like AlexNet, VGG Net, Google- Net, ResNet, ResNeXt, RCNN, YOLO, SqueezeNet, SegNet, GAN, BERT, ELMo, USE, Transformer, and Transformer-XL.

If desired, the high-level program may include a set of procedures, such as learning or inferencing in an AI or ML system. More specifically, the high-level program may include applications, graphs, application graphs, user applications, computation graphs, control flow graphs, data flow graphs, models, deep learning applications, deep learning neural networks, programs, program images, jobs, tasks and/or any other procedures and functions that may perform serial and/or parallel processing.

The architecture, configurability, and data flow capabilities of CGR array 120 enables increased compute power that supports both parallel and pipelined computation. CGR processor 110, which includes CGR arrays 120, can be programmed to simultaneously execute multiple independent and interdependent data flow graphs. To enable simultaneous execution, the data flow graphs may be distilled from a high-level program and translated to a configuration file for the CGR processor 110. In some implementations, execution of the data flow graphs may involve using more than one CGR processor 110.

Host processor 180 may be, or include, a computer such as further described with reference to FIG. 2. Host processor 180 runs runtime processes 170, as further referenced herein. In some implementations, host processor 180 may also be used to run computer programs, such as the compiler 160 further described herein with reference to FIG. 6. In some implementations, the compiler may run on a computer that is similar to the computer described with reference to FIG. 2, but separate from host processor 180.

The compiler may perform the translation of high-level programs to executable bit files. While traditional compilers sequentially map operations to processor instructions, typically without regard to pipeline utilization and duration (a task usually handled by the hardware), an array of CGR units 120 requires mapping operations to processor instructions in both space (for parallelism) and time (for synchronization of interdependent computation graphs or data flow graphs). This requirement implies that a compiler for the CGR array 120 decides which operation of a computation graph or data flow graph is assigned to which of the CGR units in the CGR array 120, and how both data and, related to the support of data flow graphs, control information flows among CGR units, and to and from host processor 180 and attached CGR processor memory 190.

The compiler may include a cost estimation tool for estimating a realized bandwidth consumption of a logical edge between a logical producer unit and a logical consumer unit of an operation unit graph during placement and routing of the logical producer unit, the logical consumer unit, and the logical edge on CGR processor 110. The cost estimation tool receives a tentative assignment of the logical edge, the logical producer unit, and the logical consumer unit to a physical link, a physical producer unit, and a physical consumer unit and determines the realized bandwidth consumption of the tentative assignment. An illustrative cost estimation tool is further described herein with reference to FIG. 8.

CGR processor 110 may accomplish computational tasks by executing a configuration file (e.g., a processor-executable format (PEF) file). For the purposes of this description, a configuration file corresponds to a data flow graph, or a translation of a data flow graph, and may further include initialization data. A compiler compiles the high-level program to provide the configuration file 165. Runtime processes 170 may install the configuration file 165 in CGR processor 110. In some implementations described herein, a CGR array 120 is configured by programming one or more configuration stores with all or parts of the configuration file 165. Therefore, the configuration file is sometimes also referred to as a programming file.

A single configuration store may be at the level of the CGR processor 110 or the CGR array 120, or a CGR unit may include an individual configuration store. The configuration file 165 may include configuration data for the CGR array and CGR units in the CGR array, and link the computation graph to the CGR array. Execution of the configuration file by CGR processor 110 causes the CGR array (s) to implement the user algorithms and functions in the data flow graph.

CGR processor 110 can be implemented on a single integrated circuit (IC) die or on a multichip module (MCM). An IC can be packaged in a single chip module or a multichip module. An MCM is an electronic package that may comprise multiple IC dies and other devices, assembled into a single module as if it were a single device. The various dies of an MCM may be mounted on a substrate, and the bare dies of the substrate are electrically coupled to the surface or to each other using for some examples, wire bonding, tape bonding or flip-chip bonding.

Figure 2:
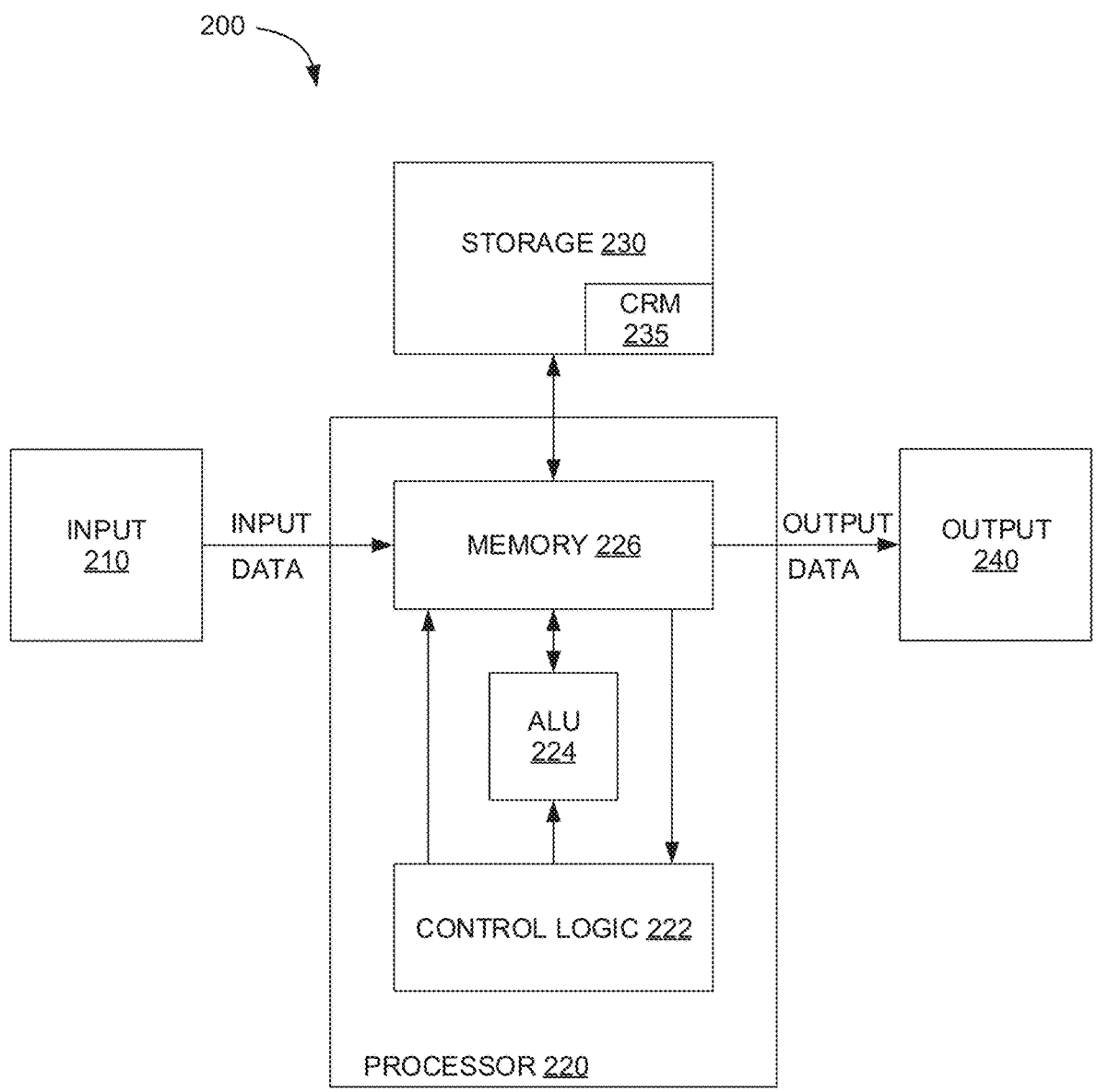
FIG. 2 is a diagram of an illustrative computer, including an input device, a processor, a storage device, and an output device.

FIG. 2 illustrates an example of a computer 200, including an input device 210, a processor 220, a storage device 230, and an output device 240. Although the example computer 200 is drawn with a single processor 220, other implementations may have multiple processors. Input device 210 may comprise a mouse, a keyboard, a sensor, an input port (e.g., a universal serial bus (USB) port), and/or any other input device known in the art. Output device 240 may comprise a monitor, printer, and/or any other output device known in the art. Illustratively, part or all of input device 210 and output device 240 may be combined in a network interface, such as a Peripheral Component Interconnect Express (PCIe) interface suitable for communicating with CGR processor 110 of FIG. 1.

Input device 210 is coupled with processor 220, which is sometimes also referred to as host processor 220, to provide input data. If desired, memory 226 of processor 220 may store the input data. Processor 220 is coupled with output device 240. In some implementations, memory 226 may provide output data to output device 240.

Processor 220 further includes control logic 222 and arithmetic logic unit (ALU) 224. Control logic 222 may be operable to control memory 226 and ALU 224. If desired, control logic 222 may be operable to receive program and configuration data from memory 226. Illustratively, control logic 222 may control exchange of data between memory 226 and storage device 230. Memory 226 may comprise memory with fast access, such as static random-access memory (SRAM). Storage device 230 may comprise memory with slow access, such as dynamic random-access memory (DRAM), flash memory, magnetic disks, optical disks, and/or any other memory type known in the art. At least a part of the memory in storage device 230 includes a non-transitory computer-readable medium (CRM) 235, such as used for storing computer programs. The storage device 230 is sometimes also referred to as host memory.

Figure 3:
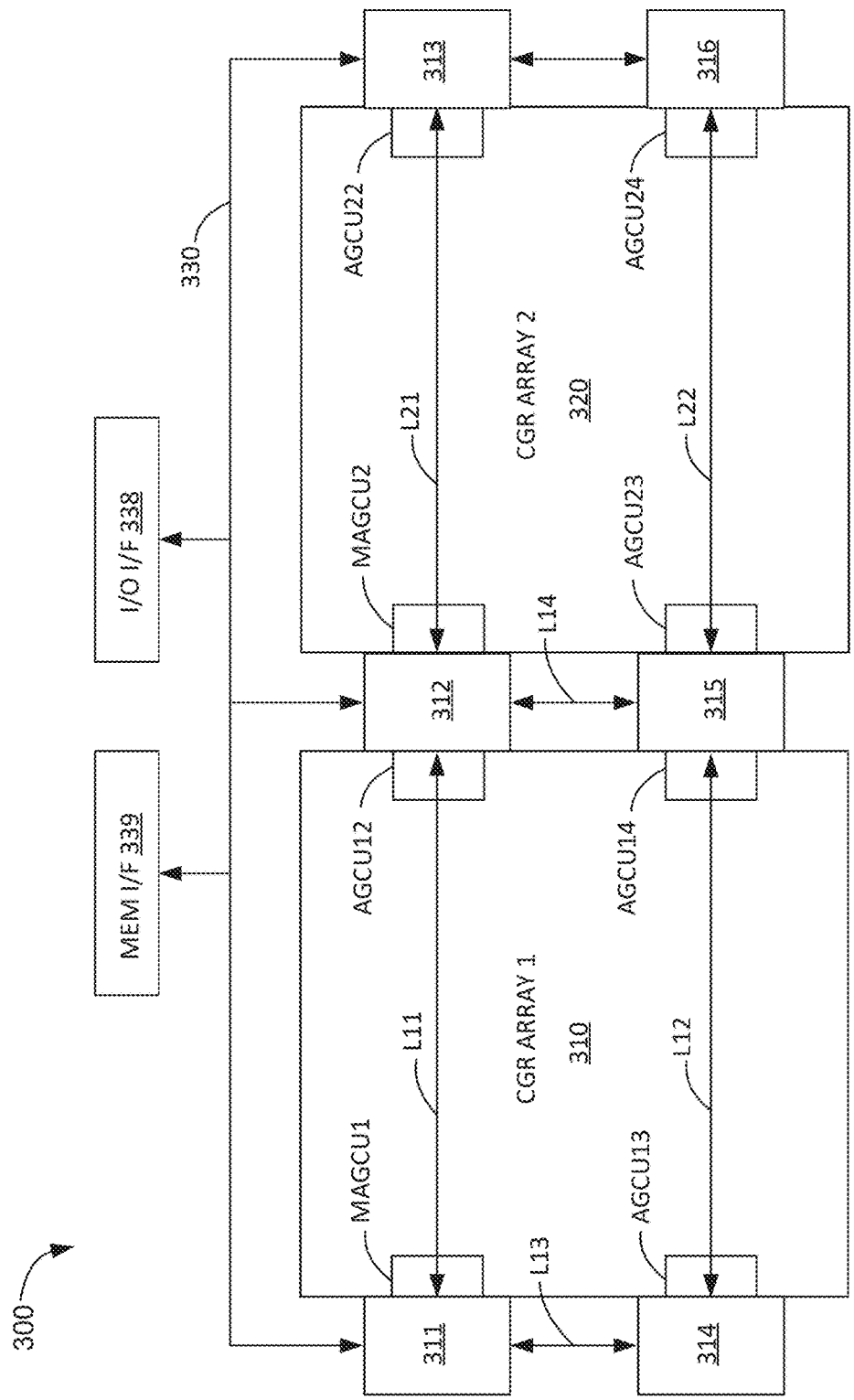
FIG. 3 is a diagram of an illustrative reconfigurable processor including a top-level network (TLN) and two CGR arrays.

FIG. 3 illustrates example details of a CGR architecture 300 including a top-level network (TLN 330) and two CGR arrays (CGR array 310 and CGR array 320). A CGR array comprises an array of CGR units (e.g., pattern memory units (PMUs), pattern compute units (PCUs), fused-control memory units (FCMUs)) coupled via an array-level network (ALN), e.g., a bus system. The ALN may be coupled with the TLN 330 through several Address Generation and Coalescing Units (AGCUs), and consequently with input/output (I/O) interface 338 (or any number of interfaces) and memory interface 339. Other implementations may use different bus or communication architectures.

Circuits on the TLN in this example include one or more external I/O interfaces, including I/O interface 338 and memory interface 339. The interfaces to external devices include circuits for routing data among circuits coupled with the TLN 330 and external devices, such as high-capacity memory, host processors, other CGR processors, FPGA devices, and so on, that may be coupled with the interfaces.

As shown in FIG. 3, each CGR array 310, 320 has four AGCUs (e.g., MAGCU1, AGCU12, AGCU13, and AGCU14 in CGR array 310). The AGCUs interface the TLN to the ALNs and route data from the TLN to the ALN or vice versa. Other implementations may have different numbers of AGCUs.

One of the AGCUs in each CGR array in this example is configured to be a master AGCU (MAGCU), which includes an array configuration load/unload controller for the CGR array. The MAGCU1 includes a configuration load/unload controller for CGR array 310, and MAGCU2 includes a configuration load/unload controller for CGR array 320. Some implementations may include more than one array configuration load/unload controller. In other implementations, an array configuration load/unload controller may be implemented by logic distributed among more than one AGCU. In yet other implementations, a configuration load/unload controller can be designed for loading and unloading configuration of more than one CGR array. In further implementations, more than one configuration controller can be designed for configuration of a single CGR array. Also, the configuration load/unload controller can be implemented in other portions of the system, including as a stand-alone circuit on the TLN and the ALN or ALNs.

The TLN 330 may be constructed using top-level switches (e.g., switch 311, switch 312, switch 313, switch 314, switch 315, and switch 316). If desired, the top-level switches may be coupled with at least one other top-level switch. At least some top-level switches may be connected with other circuits on the TLN, including the AGCUs, and external I/O interface 338.

Illustratively, the TLN 330 includes links (e.g., L11, L12, L21, L22) coupling the top-level switches. Data may travel in packets between the top-level switches on the links, and from the switches to the circuits on the network coupled with the switches. For example, switch 311 and switch 312 are coupled by link L11, switch 314 and switch 315 are coupled by link L12, switch 311 and switch 314 are coupled by link L13, and switch 312 and switch 313 are coupled by link L21. The links can include one or more buses and supporting control lines, including for example a chunk-wide bus (vector bus). For example, the top-level network can include data, request and response channels operable in coordination for transfer of data in any manner known in the art.

Figure 4:
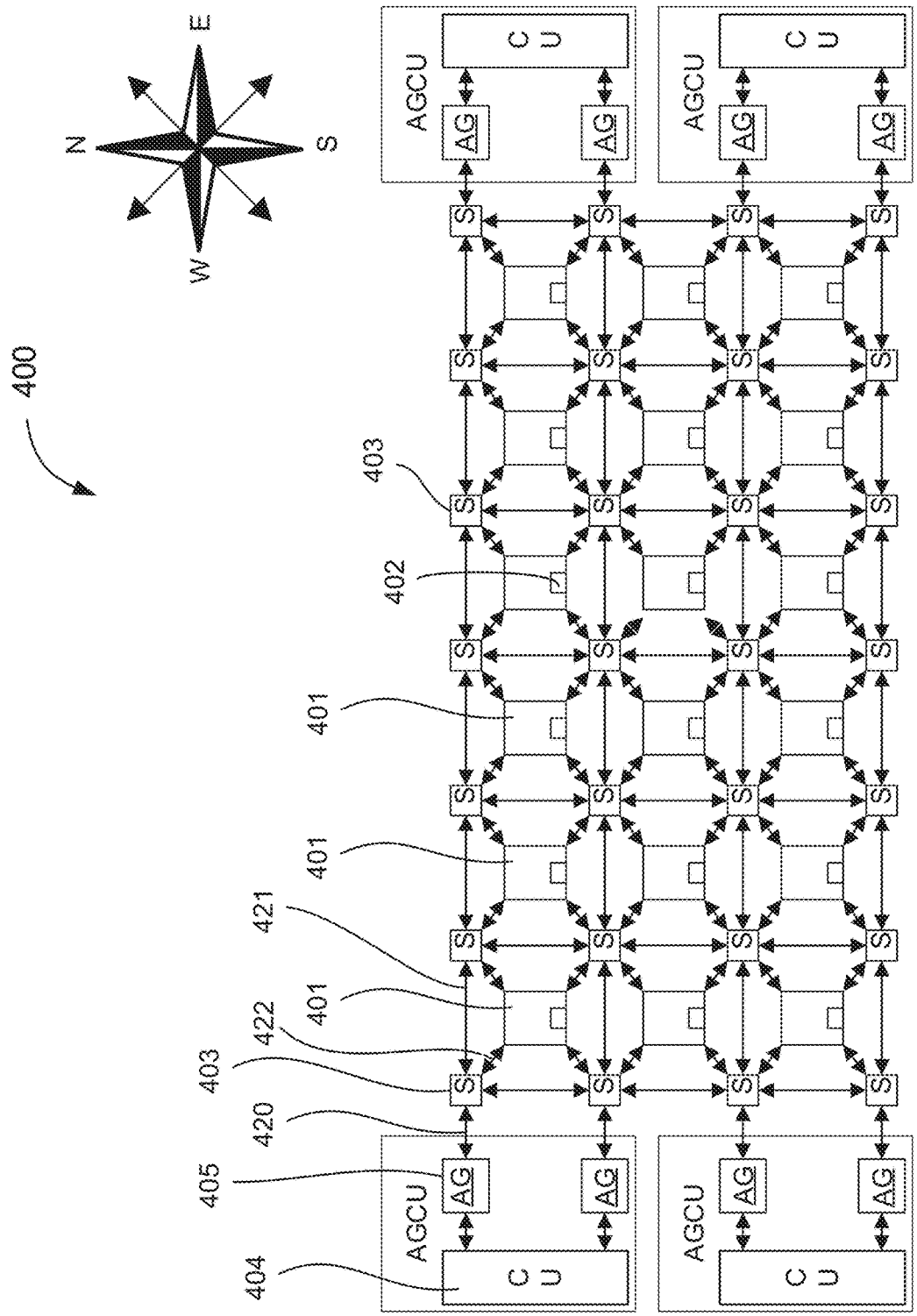
FIG. 4 is a diagram of an illustrative CGR array including CGR units and an array-level network (ALN).

FIG. 4 illustrates an example CGR array 400, including an array of CGR units in an ALN. CGR array 400 may include several types of CGR unit 401, such as FCMUs, PMUs, PCUs, memory units, and/or compute units. For examples of the functions of these types of CGR units, see Prabhakar et al., "Plasticine: A Reconfigurable Architecture for Parallel Patterns", ISCA 2017, Jun. 24-28, 2017, Toronto, ON, Canada.

Illustratively, each CGR unit of the CGR units may include a configuration store 402 comprising a set of registers or flip-flops storing configuration data that represents the setup and/or the sequence to run a program, and that can include the number of nested loops, the limits of each loop iterator, the instructions to be executed for each stage, the source of operands, and the network parameters for the input and output interfaces. In some implementations, each CGR unit 401 comprises an FCMU. In other implementations, the array comprises both PMUs and PCUs, or memory units and compute units, arranged in a checkerboard pattern. In yet other implementations, CGR units may be arranged in different patterns.

The ALN includes switch units 403 (S), and AGCUs (each including two address generators 405 (AG) and a shared coalescing unit 404 (CU)). Switch units 403 are connected among themselves via interconnects 421 and to a CGR unit 401 with interconnects 422. Switch units 403 may be coupled with address generators 405 via interconnects 420. In some implementations, communication channels can be configured as end-to-end connections, and switch units 403 are CGR units. In other implementations, switches route data via the available links based on address information in packet headers, and communication channels establish as and when needed.

A configuration file may include configuration data representing an initial configuration, or starting state, of each of the CGR units 401 that execute a high-level program with user algorithms and functions. Program load is the process of setting up the configuration stores 402 in the CGR array 400 based on the configuration data to allow the CGR units 401 to execute the high-level program. Program load may also require loading memory units and/or PMUs.

In some implementations, a runtime processor (e.g., the portions of host processor 180 of FIG. 1 that execute runtime processes 170, which is sometimes also referred to as "runtime logic") may perform the program load.

The ALN includes one or more kinds of physical data buses, for example a chunk-level vector bus (e.g., 512 bits of data), a word-level scalar bus (e.g., 32 bits of data), and a control bus. For instance, interconnects 421 between two switches may include a vector bus interconnect with a bus width of 512 bits, and a scalar bus interconnect with a bus width of 32 bits. A control bus can comprise a configurable interconnect that carries multiple control bits on signal routes designated by configuration bits in the CGR array's configuration file. The control bus can comprise physical lines separate from the data buses in some implementations. In other implementations, the control bus can be implemented using the same physical lines with a separate protocol or in a time-sharing procedure.

Physical data buses may differ in the granularity of data being transferred. In one implementation, a vector bus can carry a chunk that includes 16 channels of 32-bit floating-point data or 32 channels of 16-bit floating-point data (i.e., 512 bits) of data as its payload. A scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., Northeast, Northwest, Southeast, Southwest, etc.) used to reach the destination unit.

A CGR unit 401 may have four ports (as drawn) to interface with switch units 403, or any other number of ports suitable for an ALN. Each port may be suitable for receiving and transmitting data, or a port may be suitable for only receiving or only transmitting data.

A switch unit 403, as shown in the example of FIG. 4, may have eight interfaces. The North, South, East and West interfaces of a switch unit may be used for links between switch units 403 using interconnects 421. The Northeast, Southeast, Northwest and Southwest interfaces of a switch unit 403 may each be used to make a link with an FCMU, PCU or PMU instance using one of the interconnects 422. Two switch units 403 in each CGR array quadrant have links to an AGCU using interconnects 420. The coalescing unit 404 of the AGCU arbitrates between the address generators 405 and processes memory requests. Each of the eight interfaces of a switch unit 403 can include a vector interface, a scalar interface, and a control interface to communicate with the vector network, the scalar network, and the control network. In other implementations, a switch unit 403 may have any number of interfaces.

During execution of a graph or subgraph in a CGR array 400 after configuration, data can be sent via one or more switch units 403 and one or more interconnects 421 between the switch units to the CGR units 401 using the vector bus and vector interface(s) of the one or more switch units 403 on the ALN. A CGR array may comprise at least a part of CGR array 400, and any number of other CGR arrays coupled with CGR array 400.

A data processing operation implemented by CGR array configuration may comprise multiple graphs or subgraphs specifying data processing operations that are distributed among and executed by corresponding CGR units (e.g., FCMUs, PMUs, PCUs, AGs, and CUs).

Figure 5:
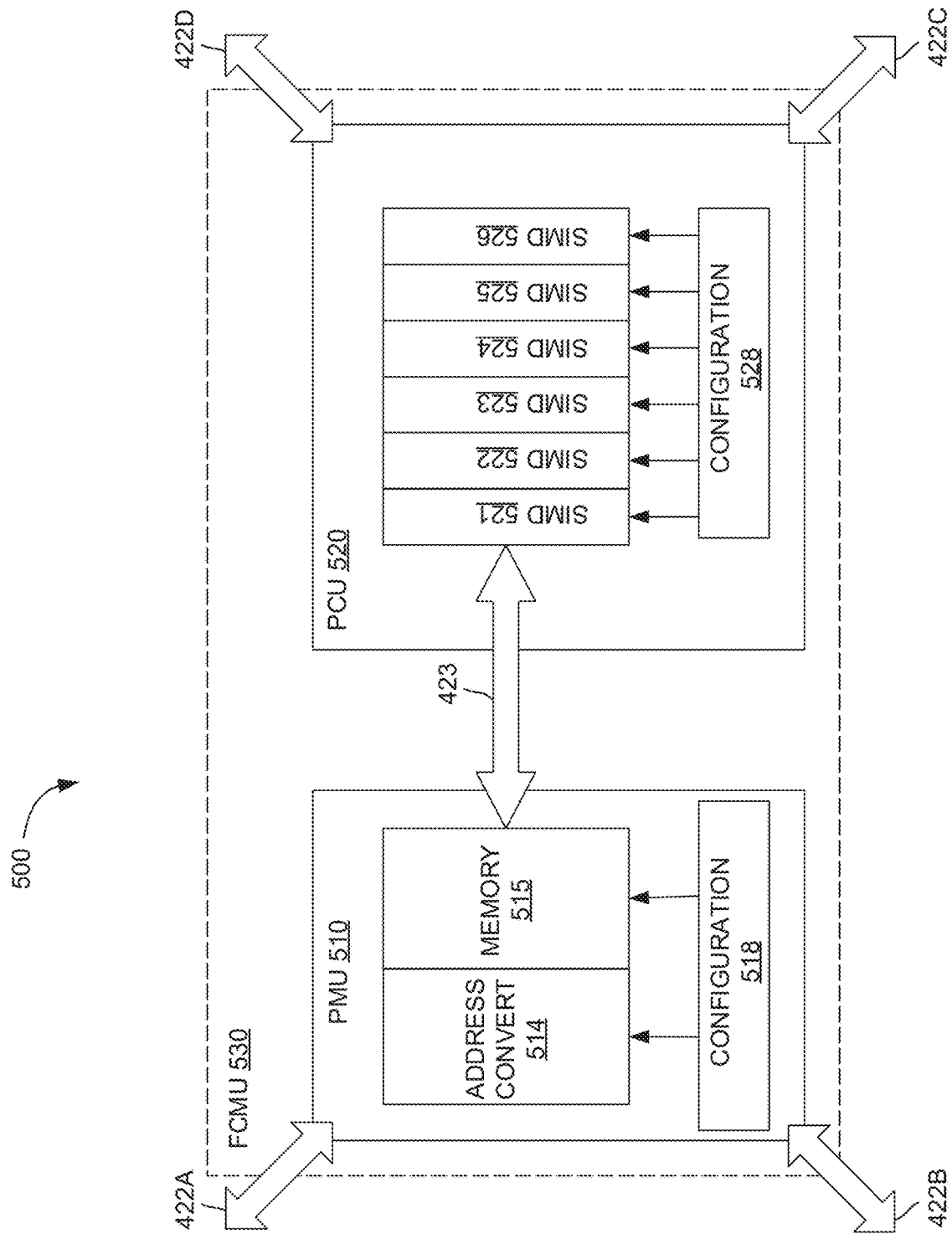
FIG. 5 illustrates an example of a pattern memory unit (PMU) and a pattern compute unit (PCU), which may be combined in a fused-control memory unit (FCMU).

FIG. 5 illustrates an example 500 of a PMU 510 and a PCU 520, which may be combined in an FCMU 530. PMU 510 may be directly coupled to PCU 520, or optionally via one or more switches. The FCMU 530 may include multiple ALN links, such as ALN link 423 that connects PMU 510 with PCU 520, northwest ALN link 422A and southwest ALN link 422B, which may connect to PMU 510, and southeast ALN link 422C and northeast ALN link 422D, which may connect to PCU 520. The northwest ALN link 422A, southwest ALN link 422B, southeast ALN link 422C, and northeast ALN link 422D may connect to switches 403 as shown in FIG. 4. Each ALN link 422A-D, 423 may include one or more scalar links, one or more vector links, and one or more control links where an individual link may be unidirectional into FCMU 530, unidirectional out of FCMU 530 or bidirectional. FCMU 530 can include FIFOs to buffer data entering and/or leaving the FCMU 530 on the links.

PMU 510 may include an address converter 514, a scratchpad memory 515, and a configuration store 518. Configuration store 518 may be loaded, for example, from a program running on host processor 180 as shown in FIG. 1, and can configure address converter 514 to generate or convert address information for scratchpad memory 515 based on data received through one or more of the ALN links 422A-B, and/or 423. Data received through ALN links 422A-B, and/or 423 may be written into scratchpad memory 515 at addresses provided by address converter 514. Data read from scratchpad memory 515 at addresses provided by address converter 514 may be sent out on one or more of the ALN links 422A-B, and/or 423.

PCU 520 includes one or more processor stages, such as single-instruction multiple-data (SIMD) 521 through SIMD 526, and configuration store 528. The processor stages may include SIMDs, as drawn, or any other reconfigurable stages that can process data. PCU 520 may receive data through ALN links 422C-D, and/or 423, and process the data in the one or more processor stages or store the data in configuration store 528. PCU 520 may produce data in the one or more processor stages, and transmit the produced data through one or more of the ALN links 422C-D, and/or 423. If the one or more processor stages include SIMDs, then the SIMDs may have a number of lanes of processing equal to the number of lanes of data provided by a vector interconnect of ALN links 422C-D, and/or 423.

Each stage in PCU 520 may also hold one or more registers (not drawn) for short-term storage of parameters. Short-term storage, for example during one to several clock cycles or unit delays, allows for synchronization of data in the PCU pipeline.

Figure 6:
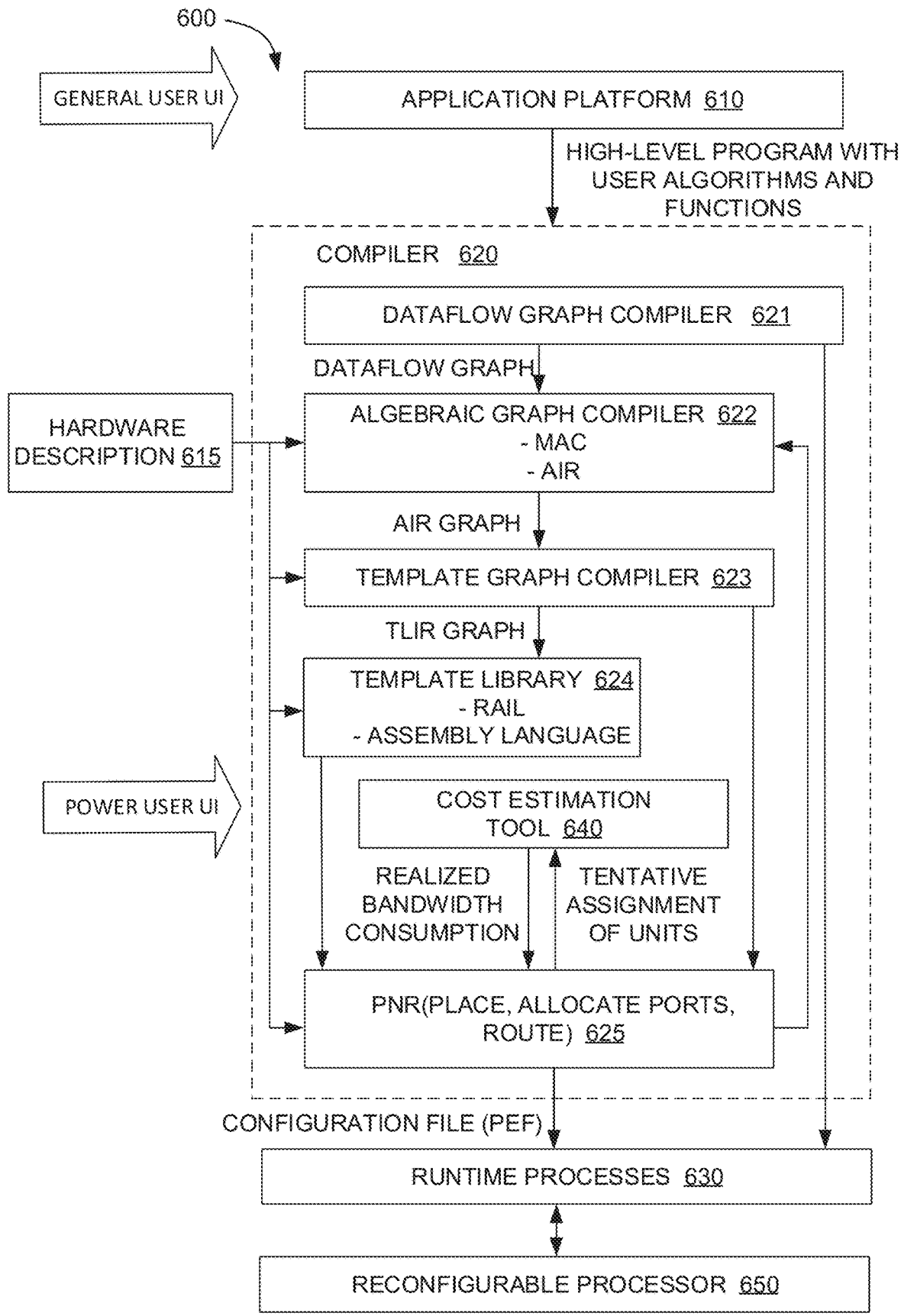
FIG. 6 is a diagram of an illustrative compiler stack implementation suitable for generating a configuration file for a reconfigurable processor.

FIG. 6 is a block diagram of a compiler stack 600 implementation suitable for generating a configuration file for a CGR processor having CGR units such as CGR processor 110 of FIG. 1. As depicted, compiler stack 600 includes several stages to convert a high-level program with statements that define user algorithms and functions, e.g., algebraic expressions and functions, to configuration data for the CGR units. A high-level program may include source code written in programming languages like C, C++, Java, JavaScript, Python, and/or Spatial, for example. In some implementations, the high-level program may include statements that invoke various PyTorch functions.

Compiler stack 600 may take its input from application platform 610, or any other source of high-level program statements suitable for parallel processing, which provides a user interface for general users. If desired, the compiler stack 600 may further receive hardware description 615, for example defining the physical units in a reconfigurable data processor or CGR processor. Application platform 610 may include libraries such as PyTorch, TensorFlow, ONNX, Caffe, and Keras to provide user-selected and configured algorithms.

Application platform 610 outputs a high-level program to compiler 620, which in turn outputs a configuration file to the reconfigurable data processor or CGR processor where it is executed in runtime processes 630 using reconfigurable processor 650.

Compiler 620 may include dataflow graph compiler 621, which may handle a dataflow graph, algebraic graph compiler 622, template graph compiler 623, template library 624, placer and router PNR 625, and cost estimation tool 640. In some implementations, template library 624 includes RDU abstract intermediate language (RAIL) and/or assembly language interfaces for power users.

Dataflow graph compiler 621 converts the high-level program with user algorithms and functions from application platform 610 to one or more dataflow graphs. The high-level program may be suitable for parallel processing, and therefore parts of the nodes of the dataflow graphs may be intrinsically parallel unless an edge in the graph indicates a dependency. Dataflow graph compiler 621 may provide code optimization steps like false data dependency elimination, dead-code elimination, and constant folding. The dataflow graphs encode the data and control dependencies of the high-level program.

Dataflow graph compiler 621 may support programming a reconfigurable data processor at higher or lower-level programming languages, for example from an application platform 610 to C++ and assembly language. In some implementations, dataflow graph compiler 621 allows programmers to provide code that runs directly on the reconfigurable data processor. In other implementations, dataflow graph compiler 621 provides one or more libraries that include predefined functions like linear algebra operations, element-wise tensor operations, non-linearities, and reductions required for creating, executing, and profiling the dataflow graphs on the reconfigurable processors. Dataflow graph compiler 621 may provide an application programming interface (API) to enhance functionality available via the application platform 610. As shown in FIG. 6, dataflow graph compiler 621 outputs a dataflow graph that is received by algebraic graph compiler 622.

Algebraic graph compiler 622 may include a model analyzer and compiler (MAC) level that makes high-level mapping decisions for (subgraphs of the) dataflow graph based on hardware constraints. In some implementations, the algebraic graph compiler 622 may support various application frontends such as Samba, JAX, and TensorFlow/HLO. If desired, the algebraic graph compiler 622 may transform the graphs via autodiff and GradNorm, perform stitching between subgraphs, interface with template generators for performance and latency estimation, convert dataflow graph operations to arithmetic or algebraic intermediate representation (AIR) operations, perform tiling, sharding (database partitioning) and other operations, and model or estimate the parallelism that can be achieved on the dataflow graph.

Algebraic graph compiler 622 may further include an arithmetic or algebraic intermediate representation (AIR) level that translates high-level graph and mapping decisions provided by the MAC level into explicit AIR/Tensor statements and one or more corresponding algebraic graphs. Key responsibilities of the AIR level include legalizing the graph and mapping decisions of the MAC, expanding data parallel, tiling, metapipe, region instructions provided by the MAC, inserting stage buffers and skip buffers, eliminating redundant operations, buffers and sections, and optimizing for resource use, latency, and throughput.

Thus, algebraic graph compiler 622 replaces the user program statements of a dataflow graph by AIR/Tensor statements of an AIR/Tensor computation graph (AIR graph). As shown in FIG. 6, algebraic graph compiler 622 provides the AIR graph to template graph compiler 623.

Template graph compiler 623 may translate AIR/Tensor statements of an AIR graph into template library intermediate representation (TLIR) statements of a TLIR graph, optimizing for the target hardware architecture into unplaced variable-sized units (referred to as logical CGR units) suitable for PNR 625. Such a TLIR graph is sometimes also referred to as an "operation unit graph" and the unplaced-variable-sized units as "logical units". Logical edges in the operation unit graph may couple the logical units.

Template graph compiler 623 may allocate metapipelines for sections of the template dataflow statements and corresponding sections of unstitched template computation graph. Template graph compiler 623 may add further information (e.g., name, inputs, input names and dataflow description) for PNR 625 and make the graph physically realizable through each performed step. For example, template graph compiler 623 may provide translation of AIR graphs to specific model operation templates such as for general matrix multiplication (GeMM). An implementation may convert part or all intermediate representation operations to templates, which are sometimes also referred to as "template nodes", stitch templates into the dataflow and control flow, insert necessary buffers and layout transforms, generate test data and optimize for hardware use, latency, and throughput.

Implementations may use templates for common operations. Templates may be implemented using assembly language, RAIL, or similar. RAIL is comparable to assembly language in that memory units and compute units are separately programmed, but it can provide a higher level of abstraction and compiler intelligence via a concise performance-oriented domain-specific language for CGR array templates. RAIL enables template writers and external power users to control interactions between logical compute units and memory units, which are commonly referred to as logical units, with high-level expressions without the need to manually program capacity splitting, register allocation, etc. The logical compute units and memory units also enable stage/register allocation, context splitting, transpose slotting, resource virtualization and mapping to multiple physical compute units and memory units (e.g., PCUs and PMUs).

Template library 624 may include an assembler that provides an architecture-independent low-level programming interface as well as optimization and code generation for the target hardware. Responsibilities of the assembler may include address expression compilation, intra-unit resource allocation and management, making a template graph physically realizable with target-specific rules, low-level architecture-specific transformations and optimizations, and architecture-specific code generation. In some implementations, the assembler may generate assembler code for a logical unit, whereby the assembler code is associated with a data operation that is to be executed by the logical unit. The logical units of an operation unit graph may include (e.g., store) the assembler code that is associated with the respective data operations of the respective logical units, if desired.

The template graph compiler 623 may also determine control signals, as well as control gates that are required to enable the CGR units (whether logical or physical) to coordinate dataflow between the CGR units in the CGR array of a CGR processor.

As shown in FIG. 6, compiler 620 includes PNR 625. PNR 625 receives an operation unit graph that includes logical units and logical edges that couple the logical units. Illustratively, PNR 625 may receive its input data in various ways. For example, it may receive parts of its input data from any of the earlier modules (e.g., dataflow graph compiler 621, algebraic graph compiler 622, template graph compiler 623, and/or template library 624). In some implementations, an earlier module, such as template graph compiler 623, may have the task of preparing all information for PNR 625 and no other units provide PNR input data directly.

Each one of the logical units of the operation unit graph is associated with a data operation. For example, the operation unit graph may include a first logical unit that performs a first data operation and has a first port, a second logical unit that performs a second data operation and has a second port, and a logical edge that connects the first port with the second port.

PNR 625 translates and maps logical (i.e., unplaced physically realizable) units (e.g., the nodes of the operation unit graph) and logical edges (e.g., the edges of the operation unit graph) to a physical layout of reconfigurable processor 650, e.g., a physical array of CGR units in a semiconductor chip. PNR 625 also determines physical data channels to enable communication among the CGR units and between the CGR units and circuits coupled via the TLN and ALN; allocates ports on the CGR units and switches; provides configuration data and initialization data for the target hardware; and produces configuration files, e.g., processor-executable format (PEF) files.

If desired, PNR 625 may provide bandwidth calculations, allocate network interfaces such as AGCUs and virtual address generators (VAGs), provide configuration data that allows AGCUs and/or VAGs to perform address translation, and control ALN switches and data routing. PNR 625 may provide its functionality in multiple steps and may include multiple modules (not shown in FIG. 6) to provide the multiple steps, e.g., a placer, a router, a port allocator, and a PEF file generator.

Illustratively, the compiler 620 may include a cost estimation tool 640. The cost estimation tool 640 is adapted for estimating a realized bandwidth consumption of a logical edge between a logical producer unit and a logical consumer unit of an operation unit graph during placement and routing of the logical producer unit, the logical consumer unit, and the logical edge onto a reconfigurable processor 650. The realized bandwidth consumption of the logical edge may serve as a cost estimation for implementing the logical producer unit, the logical consumer unit, and the logical edge of the operation unit graph on reconfigurable processor 650.

As shown in FIG. 6, cost estimation tool 640 receives a tentative assignment of a logical edge, a logical producer unit, and a logical consumer unit to one or more physical links, a physical producer unit, and a physical consumer unit, respectively, from PNR 625. The cost estimation tool 640 provides realized bandwidth consumption of the tentative assignment as a cost estimation for the tentative assignment of the logical edge, the logical producer unit, and the logical consumer unit of the operation unit graph on reconfigurable processor 650 to PNR 625.

As shown in FIG. 6, PNR 625 may receive the realized bandwidth consumption as a cost estimation for implementing the operation unit graph on reconfigurable processor 650.

Further implementations of compiler 620 provide for an iterative process, for example by feeding information from PNR 625 back to an earlier module. For example, in some implementations, the earlier module may execute a new compilation step in which it uses physically realized results rather than estimates of cost estimation tool 640 or placeholders for physically realizable circuits. As shown in FIG. 6, PNR 625 may feed information regarding the physically realized circuits back to algebraic graph compiler 622.

Memory allocations represent the creation of logical memory spaces in on-chip and/or off-chip memories for data required to implement the dataflow graph, and these memory allocations are specified in the configuration file. Memory allocations define the type and the number of hardware circuits (functional units, storage, or connectivity components). Main memory (e.g., DRAM) may be off-chip memory, and scratchpad memory (e.g., SRAM) is on-chip memory inside a CGR array. Other memory types for which the memory allocations can be made for various access patterns and layouts include cache, read-only look-up tables (LUTs), serial memories (e.g., FIFOs), and register files.

Compiler 620 binds memory allocations to unplaced memory units and binds operations specified by operation nodes in the dataflow graph to unplaced compute units, and these bindings may be specified in the configuration data. In some implementations, compiler 620 partitions parts of a dataflow graph into memory subgraphs and compute subgraphs, and specifies these subgraphs in the PEF file. A memory subgraph may comprise address calculations leading up to a memory access. A compute subgraph may comprise all other operations in the parent graph. In one implementation, a parent graph is broken up into multiple memory subgraphs and exactly one compute subgraph. A single parent graph can produce one or more memory subgraphs, depending on how many memory accesses exist in the original loop body. In cases where the same memory addressing logic is shared across multiple memory accesses, address calculation may be duplicated to create multiple memory subgraphs from the same parent graph.

Compiler 620 generates the configuration files with configuration data (e.g., a bit stream) for the placed positions and the routed data and control networks. In one implementation, this includes assigning coordinates and communication resources of the physical CGR units by placing and routing unplaced units onto the array of CGR units while maximizing bandwidth, minimizing latency, and avoiding congestion.

As mentioned above, the cost estimation tool 640 may estimate a realized bandwidth consumption of a logical edge between a logical producer unit and a logical consumer unit of an operation unit graph during placement and routing of the logical producer unit, the logical consumer unit, and the logical edge on reconfigurable processor 650.

Figure 7:
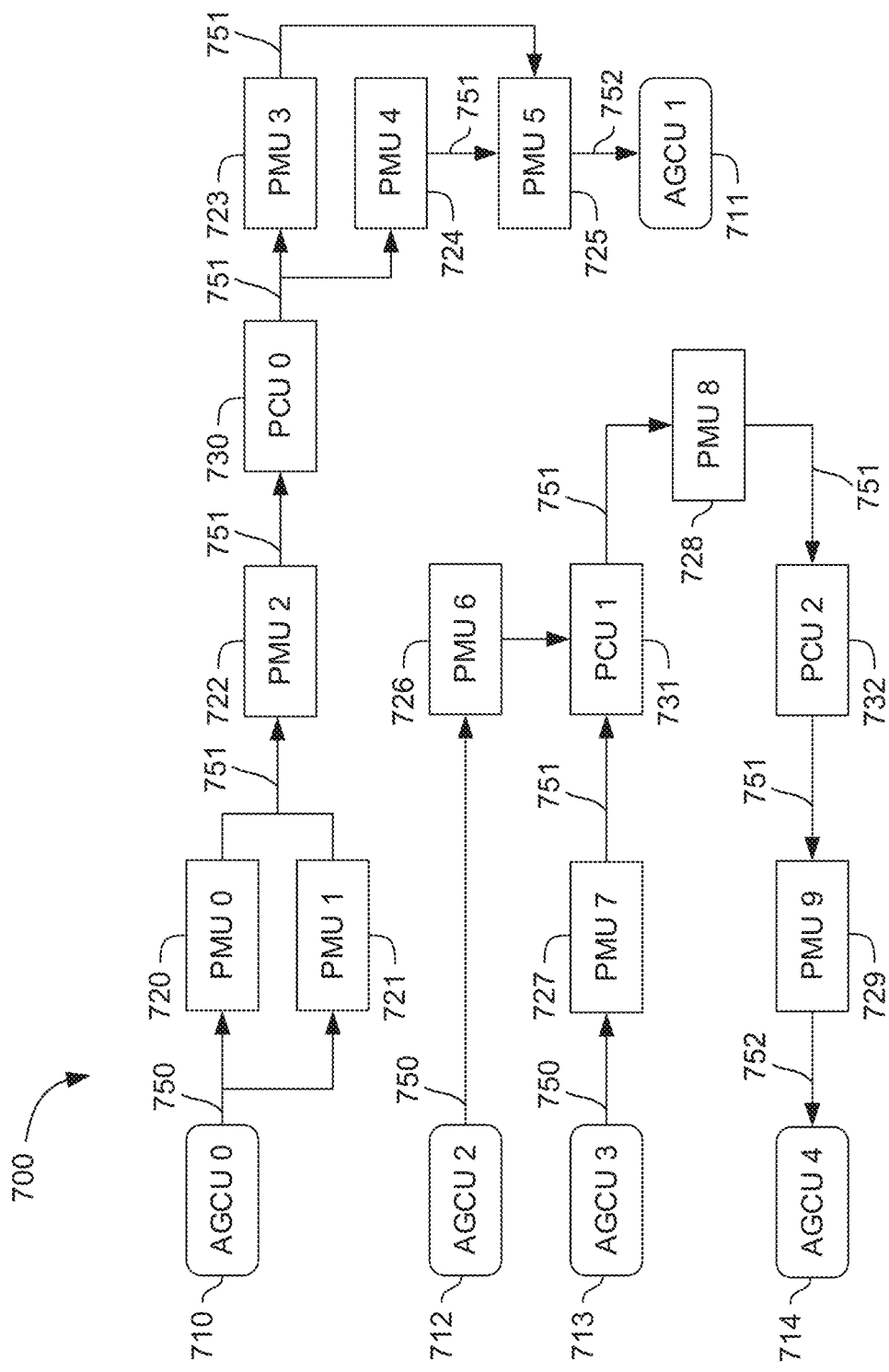
FIG. 7 is a diagram of an illustrative operation unit graph.

FIG. 7 is a diagram of an illustrative operation unit graph 700. The operation unit graph 700 shown in FIG. 7 includes logical units 710 to 714, 720 to 729, and 730 to 732.

The logical units are associated with data operations. The data operations may include configuration load, configuration unload, arithmetic operations, storage operations, just to name a few. If desired, each logical unit may include assembler code that is associated with the data operation. For example, a first logical unit of the logical units in the operation unit graph may include assembler code that is associated with the data operation of the first logical unit.

Illustratively, the operation unit graph 700 may include different types of logical units. For example, a first logical unit of the logical units may include a compute unit or a memory unit. As shown in FIG. 7, the operation unit graph 700 may include AGCUs 710 to 714, PMUs 720 to 729, and PCUs 730 to 732.

The logical units may have ports. Illustratively, the logical units may have one or more input ports and/or one or more output ports. As an example, logical units 710, 712, 713 may have one or more output ports. As another example, logical units 711, 714 may have one or more input ports. As yet another example, logical units 720 to 732 may have one or more input ports and one or more output ports.

Note that logical units 710, 712, 713 are shown without input ports and logical units 711, 714 are shown without output ports. However, logical units 710, 712, 713 have input ports and logical units 711, 714 have output ports. The input ports of logical unit 710, 712, 713 and the output ports of logical units 711, 714 may be coupled outside of the operation unit graph 700 (e.g., via a network).

As shown in FIG. 7, the operation unit graph 700 includes logical edges 750, 751, 752 that couple the logical units. For example, the logical edges may connect the logical units at the ports. As an example, logical edges 750 may connect an output port of a logical unit (e.g., logical unit 710, 712, 713) having one or more output ports with an input port of another logical unit (e.g., logical unit 720, 721, 726, 727). As another example, logical edges 751 may connect an output port of a logical unit (e.g., logical unit 722, 723, etc.) having one or more input ports and one or more output ports with an input port of another logical unit (e.g., logical unit 730, 725, etc.) having one or more input ports and one or more output ports. As yet another example, logical edges 752 may connect an output port of a logical unit (e.g., logical unit 725, 729) having one or more input ports and one or more output ports with an input port of another logical unit (e.g., logical unit 711, 714, etc.) having one or more input ports.

In some implementations, the operation unit graph may include logical edges that represent nets. These nets may have a fanout greater than one. For example, the logical edge that connects to the output port of logical unit 730 is shown as a net of fanout two that feeds into logical units 723 and 724. In other implementations logical edges are shown as connections having exactly one fan-in and one fanout. For example, the connection from the output port of logical unit 730 may be shown as two logical edges instead of being shown as a net with a fanout of two: a first logical edge from logical unit 730 to logical unit 723 and a second logical edge from logical unit 730 to logical unit 724.

As shown in FIG. 7, the operation unit graph 700 includes first and second subgraphs, whereby the latencies of the first and second subgraphs are independent from each other. For example, the first subgraph may include logical units 710, 720, 721, 722, 730, 723, 724, 725, and 711, and the second subgraph may include logical units 712, 726, 713, 727, 731, 728, 732, 729, and 714.

Each subgraph may include a start stage buffer and an end stage buffer and K paths between the start stage buffer and the end stage buffer, where K is an integer greater than zero. As an example, AGCU0 710 may be the start stage buffer of the first subgraph and AGCU1 711 the end stage buffer of the first subgraph. As another example, AGCU2 712 and AGCU3 713 may be start stage buffers of the second subgraph and AGCU4 714 the end stage buffer of the second subgraph. As yet another example, PMU8 728, PCU2 732, and PMU9 729 may form a subgraph with PMU8 728 being the start stage buffer and PMU9 729 being the end stage buffer of the subgraph. In this example, PMU8 728 may be the end stage buffer of another subgraph.

As shown in FIG. 7, the first subgraph includes four paths between the start stage buffer 710 and the end stage buffer 711, and the second subgraph includes two paths between the start stage buffers 712, 713 and the end stage buffer 714. The first path in the first subgraph includes logical units 710, 720, 722, 730, 723, 725, and 711. The second path in the first subgraph includes logical units 710, 721, 722, 730, 723, 725, and 711. The third path in the first subgraph includes logical units 710, 720, 722, 730, 724, 725, and 711. The fourth path in the first subgraph includes logical units 710, 721, 722, 730, 724, 725, and 711. The first path in the second subgraph includes logical units 712, 726, 731, 728, 732, 729, and 714. The second path in the second subgraph includes logical units 713, 727, 731, 728, 732, 729, and 714. Each path in the first and second subgraphs may have a different latency.

In some scenarios, the logical units in a path of the K paths of a subgraph may implement templates, which are sometimes also referred to as template nodes, having template node latencies. In these scenarios, the latency of the path of the K paths may be determined as a sum of the template node latencies of the template nodes in the path. In some implementations, all logical units of operation unit graph 700 may implement template nodes, and the latencies of every path may be determined as a sum of the template node latencies of the template nodes in the respective path.

Figure 8:
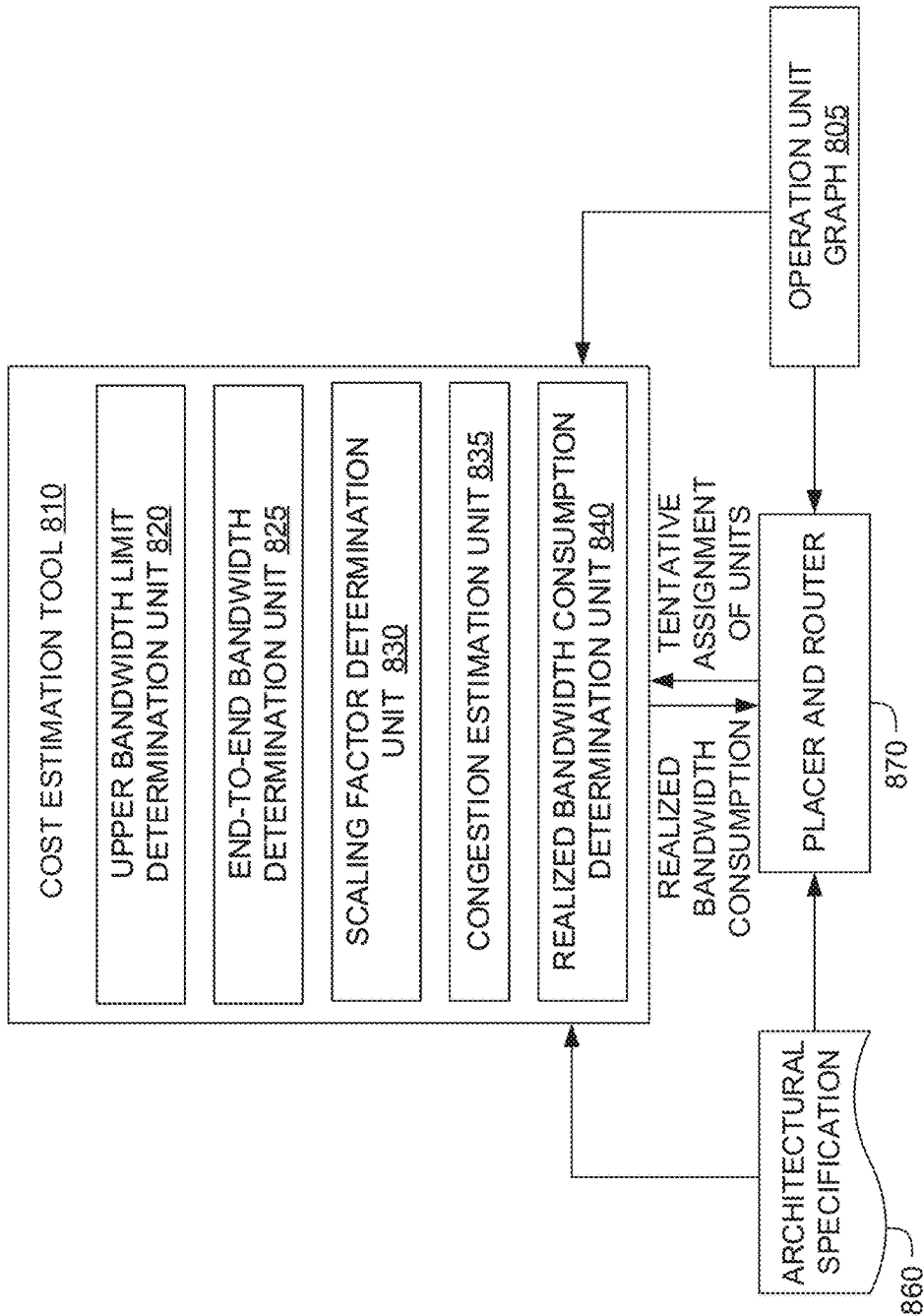
FIG. 8 is a diagram of an illustrative cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor.

FIG. 8 is a diagram of an illustrative cost estimation tool 810 that receives an operation unit graph 805 (e.g., operation unit graph 700 of FIG. 7) and architectural specifications 860. Cost estimation tool 810 also receives assignments or tentative assignments of the operation unit graph 805 or portions of the operation unit graph to physical units and physical links of a reconfigurable processor. The cost estimation tool 810 determines a realized bandwidth consumption of the assignment or the tentative assignment. As shown in FIG. 8, the cost estimation tool 810 provides the realized bandwidth consumption as a cost estimation of implementing the operation unit graph on the reconfigurable processor (e.g., CGR processor 110 having arrays of CGR units 120 of FIG. 1 or reconfigurable processor 650 of FIG. 6) to placer and router 870.

If desired, the illustrative cost estimation tool 810 may include an upper bandwidth limit determination unit 820, an end-to-end bandwidth determination unit 825, a scaling factor determination unit 830, a congestion estimation unit 835, and a realized bandwidth consumption determination unit 840.

As an example, consider the scenario in which the cost estimation tool 810 is configured to receive an operation unit graph 805 including a logical producer unit, a logical consumer unit, and a logical edge that couple the logical producer unit with the logical consumer unit. The cost estimation tool 810 is further configured to receive a tentative assignment of the logical producer unit, the logical consumer unit, and the logical edge to a physical producer unit, a physical consumer unit, and one or more physical links, respectively. For simplicity and without loss of generality, we assume hereinafter that the logical edge is tentatively assigned to a single physical link. However, the logical edge may be tentatively assigned to more than one physical link. In some implementations, the tentative assignment of the logical edge may include several physical links and switches between the physical links. For example, the tentative assignment of the logical edge may include physical links 421 and switches 403 of FIG. 4.

In this scenario, the upper bandwidth limit determination unit 820 of the cost estimation tool 810 is configured to determine an upper output bandwidth limit of the logical producer unit, an upper input bandwidth limit of the logical consumer unit, and an upper bandwidth limit of the logical edge based on the upper output bandwidth limit and the upper input bandwidth limit.

The upper output bandwidth limit of the logical producer unit and the upper input bandwidth limit of the logical consumer limit may be determined based on the data operation of the respective logical units. In some implementations, the logical producer unit and the logical consumer unit may both include assembler code that is associated with the data operation of the respective logical units, and determining the upper bandwidth limits of the logical units based on the data operation associated with the respective one of the logical units may include determining a pattern in the assembler code of the respective logical units. In some implementations, the cost estimation tool 810 may execute the upper bandwidth limit determination unit 820 only once to determine an upper bandwidth limit of the logical producer unit, the logical consumer unit, and the logical edge (e.g., before placer and router 870 provides a first tentative assignment of units to the cost estimation tool 810). The cost estimation tool 810 may apply the upper bandwidth limit of the logical producer unit, the logical consumer unit, and the logical edge to the physical producer unit, the physical consumer unit, and the physical link of the tentative assignment, if desired.

As an example, in response to determining that the pattern in the assembler code comprises a sequence-id based address calculation, the upper bandwidth limit determination unit 820 may determine the upper bandwidth limit of the logical unit based on a depth of an input first-in first-out (FIFO) buffer of the port of the logical unit divided by a number of arithmetic logic unit (ALU) stages used for address calculation. For example, the upper bandwidth limit of the logical unit BW may be determined as $$BW = \frac{D}{C_0 + C_1 \times S}$$

where D is the input FIFO depth of the port, $C_0$ and $C_1$ are architecture specific constants that account for internal latencies, and S is the number of ALU stages being used for address calculation based on the sequence ID.

As another example, in response to determining that the pattern in the assembler code comprises bubbles in a pipeline of a memory unit, the upper bandwidth limit determination unit 820 may determine the upper bandwidth limit of the logical units based on a number of vectors processed by the memory unit to trigger a token generation divided by a sum of a constant that is based on the bubbles being inserted into the pipeline and the number of vectors processed by the memory unit to trigger the token generation. For example, the upper bandwidth limit of the logical unit BW may be determined as $$BW = \frac{V}{V + C_2}$$

where V is the number of vectors being processed in the logical unit to trigger an internal token being generated in the logical unit. $C_2$ is an architectural specific constant to account for the bubbles being inserted in the logical unit pipeline when a logical unit internal token is being generated. V is derived from the assembler codes that describe token generation.

As yet another example, in response to determining that the pattern in the assembler code comprises a dequeue operation of a memory unit, the upper bandwidth limit determination unit 820 may determine the upper bandwidth limit of the logical unit based on one divided by a number of memory access operations that occur before the memory unit consumes one entry from an input FIFO buffer. For example, the upper bandwidth limit of the logical unit BW may be determined as $$BW = \frac{1}{SA}$$

where SA is a number of SRAM memory access operations that occur before the memory unit consumes one entry from the input FIFO.

As yet another example, in response to determining that the pattern in the assembler code comprises a dequeue operation of a compute unit, the upper bandwidth limit determination unit 820 may determine the upper bandwidth limit of the logical unit based on one divided by a number of enable signals that flow through a number of arithmetic logic unit (ALU) stages. For example, the upper bandwidth limit of the logical unit BW may be determined as $$BW = \frac{1}{OP}$$

where OP is a number of enables that flows through the ALU stages of the logical unit.

As yet another example, in response to determining that the pattern in the assembler code comprises a tail function of a compute unit or a systolic operation of a compute unit, the upper bandwidth limit determination unit 820 may determine the upper bandwidth limit of the logical unit based on a number of vectors being processed by the compute unit divided by a sum of a constant and a latency of the compute unit. For example, the upper bandwidth limit of the logical unit BW may be determined as $$BW = \frac{V}{C + L}$$

where V is a number of vectors flowing into the logical unit, C is a duration for consuming the vectors, and L is a constant representing an internal delay of the logical unit.

The upper bandwidth limit of a physical link may be defined as the maximum bandwidth that the logical edge can consume. For example, in a one-to-one connection between a physical producer unit and a physical consumer unit, the upper bandwidth limit of the logical edge may be determined as the minimum of the upper bandwidth limit of the physical producer unit and the upper bandwidth limit of the physical consumer unit.

The end-to-end bandwidth determination unit 825 of the cost estimation tool 810 is configured to determine an end-to-end bandwidth between the physical producer unit and the physical consumer unit. In some implementations, the end-to-end bandwidth may depend on whether the physical consumer unit is blocking or not blocking. As an example, the physical consumer unit may be blocking if it is not end-to-end credit controlled. As another example, the physical consumer unit may be not blocking if it is end-to-end credit controlled. If desired, each credit may represent a vector.

Thus, for determining the end-to-end bandwidth between the physical producer unit and the physical consumer unit, the end-to-end bandwidth determination unit 825 of the cost estimation tool 810 may be configured to determine the end-to-end bandwidth to be 100 percent in response to determining that the physical consumer unit is not end-to-end credit-controlled.

In response to determining that the physical consumer unit is end-to-end credit-controlled and that each credit represents one vector, the end-to-end bandwidth determination unit 825 of the cost estimation tool 810 may, for determining the end-to-end bandwidth between the physical producer unit and the physical consumer unit, be configured to determine a number of hops between the physical producer unit and the physical consumer unit, and determine a maximum Manhattan distance between the physical producer unit and the physical consumer unit and between the physical producer unit and any other placed physical consumer unit. For example, the physical producer unit may transmit data to the physical consumer unit as well as to other physical consumer units from the same port.

In some implementations, the end-to-end bandwidth determination unit 825 of the cost estimation tool 810 may determine the end-to-end bandwidth between the physical producer unit and the physical consumer unit as a predetermined first-in first-out (FIFO) buffer depth divided by a round-trip latency between the physical producer and consumer units.

The FIFO buffer depth may depend on the architecture of the reconfigurable processor. If desired, the architectural specifications 860 may provide the FIFO buffer depth to the cost estimation tool 810. In some implementations, the FIFO buffer depth may be 64. In other implementations, the FIFO buffer depth may be less than 64. In yet other implementations, the FIFO buffer depth may be greater than 64.

If desired, the end-to-end bandwidth determination unit 825 of the cost estimation tool 810 may, for determining the end-to-end bandwidth between the physical producer unit and the physical consumer unit, be configured to determine a first latency and a second latency. The first latency may be based on multiplying the number of hops with a hop-to-hop latency. The second latency may be based on multiplying the maximum Manhattan distance with a predetermined barrier latency.

Illustratively, the end-to-end bandwidth determination unit 825 may be configured to determine the end-to-end bandwidth between the physical producer unit and the physical consumer unit based on dividing a predetermined first-in first-out (FIFO) buffer depth by a sum of the first and second latencies. In some implementations, the end-to-end bandwidth determination unit may be configured to determine the second latency as the sum of a network congestion-caused slow down and the product of the maximum Manhattan distance with a predetermined barrier latency.

The architectural specification 860 may provide the hop-to-hop latency and the predetermined barrier latency. Thus, the hop-to-hop latency and the predetermined barrier latency depend on the architecture of the reconfigurable processor on which PNR 870 implements the operation unit graph 805. As an example, in some reconfigurable processors, a data packet may require two clock cycles to pass a switch from a physical unit in one row to another physical unit in the same column but a neighboring row or from a physical unit in one column to another physical unit in the same row but a neighboring column (i.e., hop-to-hop latency=2) and five clock cycles for a physical unit to consume a control token and produce a barriered end-to-end credit return (i.e., predetermined barrier latency=5).

The scaling factor determination unit 830 of the cost estimation tool 810 is configured to determine a scaling factor of the realized bandwidth. In some implementations, the scaling factor determination unit 830 of the cost estimation tool 810 may be configured to determine the scaling factor of the realized bandwidth based on a division of a number of active cycles by a number of stage cycles. Thus, for determining the scaling factor of the realized bandwidth, the cost estimation tool may be configured to determine a number of active cycles of the logical edge and a number of stage cycles.

Active cycles is defined as the period or extend in which a logical unit is sending or receiving vectors during the stage cycles. If desired, active cycles may be approximated by the number of vectors that are sent from the logical producer unit to the logical consumer unit during the stage cycles, which is approximately equal to the number of cycles that the path between the logical producer unit and the logical consumer unit is active in the absence of congestion, assuming one vector per cycle.

For determining the number of active cycles, the scaling factor determination unit 830 of the cost estimation tool 810 may be configured to determine all paths that pass through the logical edge, determine an accumulated active cycle for each one of all the paths that pass through the logical edge, and determine the number of active cycles as a maximum accumulated active cycle of the accumulated active cycle for each one of all the paths that pass through the logical edge. In some implementations, the cost estimation tool 810 may execute the scaling factor determination unit 830 only once based on the operation unit graph to determine a scaling factor of the logical edges.

The computation cost of determining the number of active cycles may be high. Therefore, in some implementations, a conservative estimation assumes that the logical edge has as many active cycles as stage cycles. Thus, in these implementations, the scaling factor of the realized bandwidth may be set to 1.0, and the scaling factor determination unit 830 can be omitted.

The congestion estimation unit 835 of the cost estimation tool 810 is configured to determine a congestion estimation of the physical link. For determining the congestion estimation of the physical link, the cost estimation tool 810 may be configured to determine all logical edges of the operation unit graph 805 that are assigned to use the physical link, and determine a sum of realized average bandwidths of all the logical edges that are assigned to use the physical link. As an example, the congestion estimation of the physical link may be determined as one divided by the sum of realized average bandwidths of all the logical edges that are assigned to use the physical link.

If desired, the congestion estimation unit 835 may be configured to assume that the capacity of a physical link is 100 percent, and that the capacity of the physical link is divided equally among all logical edges that share the link. For any subset of logical edges on the physical link that share the same physical producer unit and port, the total contribution of the subset of logical edges may be equal to the maximum realized average bandwidth of any edge in the subset of logical edges.

The realized bandwidth consumption determination unit 840 of the cost estimation tool 810 is configured to determine the realized bandwidth consumption of the tentative assignment based on the upper bandwidth limit of the logical edge, the end-to-end bandwidth, the scaling factor of the realized bandwidth, and the congestion estimation of the physical link.

As an example, the realized bandwidth consumption determination unit 840 of the cost estimation tool 810 may be configured to determine the realized bandwidth consumption of the tentative assignment by selecting the minimum of the upper bandwidth limit of the logical edge and the end-to-end bandwidth and multiply this minimum with the scaling factor of the realized bandwidth and the congestion estimation of the physical link.

As shown in FIG. 8, the cost estimation tool 810 may provide the realized bandwidth consumption of the tentative assignment of the logical producer unit, the logical consumer unit, and the logical edge to the physical producer unit, the physical consumer unit and the one or more physical links as a cost estimation to placer and router 870.

Figure 9:
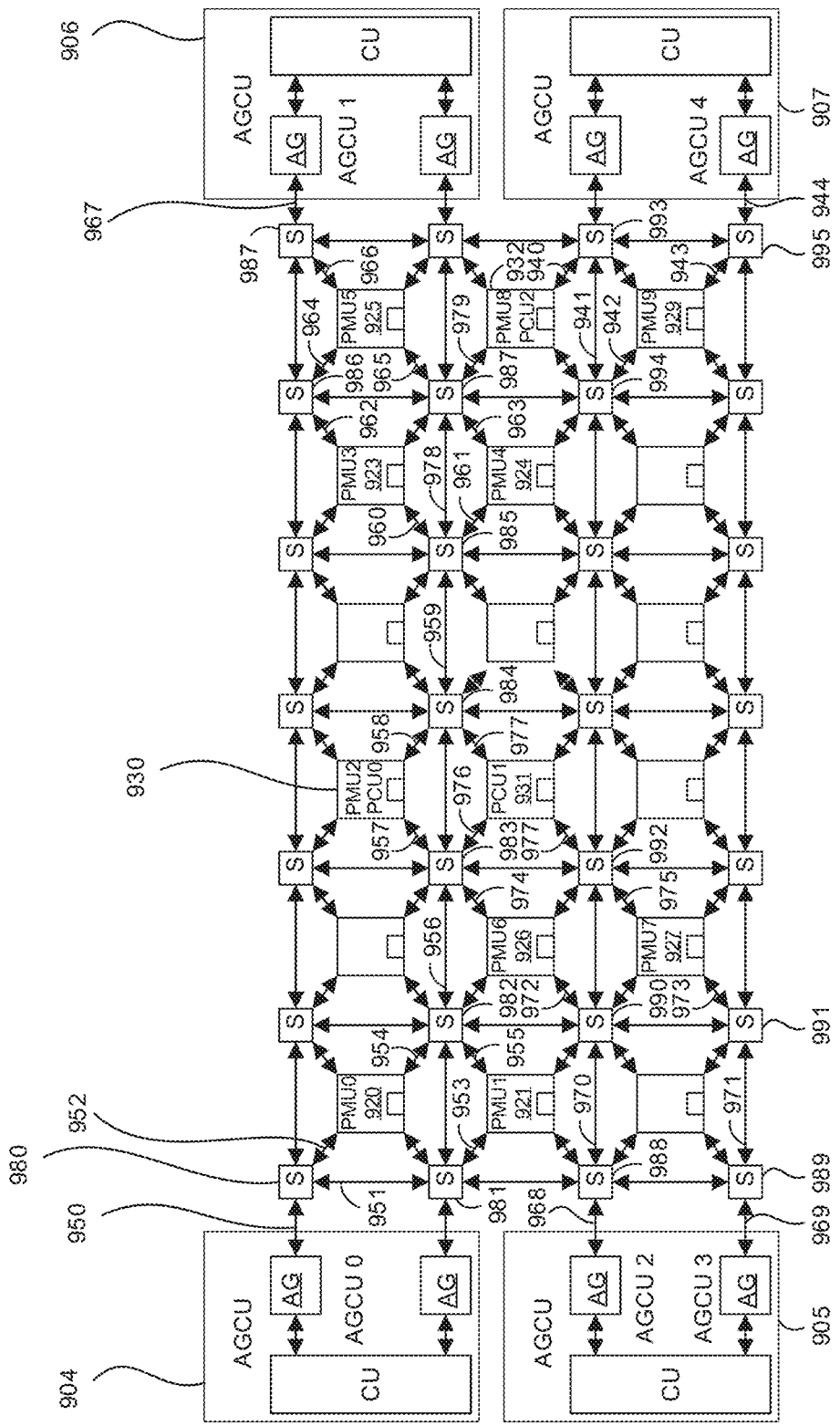
FIG. 9 is a diagram of an illustrative assignment of logical units and logical edges of an operation unit graph onto physical units and physical links of a reconfigurable processor.

FIG. 9 is a diagram of an illustrative assignment of the logical units and the logical edges of the first subgraph of operation unit graph 700 of FIG. 7 including logical units 710, 711, 720, 721,722, 723, 724, 725, 730 and logical edges 750, 751, 752 onto physical units 401 and physical links 420, 421, 422 of the reconfigurable processor 400 of FIG. 4.

As shown in FIG. 9, logical units 710, 711, 720, 721,722, 723, 724, 725, and 730 of FIG. 7 are assigned to physical units 904, 906, 920, 921, 930, 923, 924, 925, and 930, respectively, and logical units 712, 713, 714, 726, 727, 728, 729, 731, and 732 of FIG. 7 are assigned physical units 905 (upper portion), 905 (lower portion), 907, 926, 927, 932, 929, 931, and 932, respectively. Illustratively, at least physical units 930 and 932 may implement an FCMU as illustratively shown as FCMU 530 as shown in FIG. 5, whereby logical units 722 and 730 are assigned to the same physical unit 930, and logical units 728 and 732 are assigned to the same physical unit 932.

Illustratively, the logical edges of the first subgraph of the operation unit graph 700 of FIG. 7 may be assigned to the physical edges and switches of the reconfigurable processor 400 of FIG. 4 as follows: Logical edge 750 that couples logical units 710 and 720 is assigned to physical link 950, switch 980, and physical link 952. Logical edge 750 that couples logical units 710 and 721 is assigned to physical link 950, switch 980, physical link 951, switch 981, and physical link 953. Logical edge 751 that couples logical units 720 and 722 is assigned to physical link 954, switch 982, physical link 956, switch 983, and physical link 957. Logical edge 751 that couples logical units 721 and 722 is assigned to physical link 955, switch 982, physical link 956, switch 983, and physical link 957. Logical edge 751 that couples logical units 722 and 730 is realized inside physical unit 930 (e.g., using physical connection 423 between PMU 510 and PCU 520 of FIG. 5) and is not assigned to a physical link outside of a physical unit of the reconfigurable processor. Logical edge 751 that couples logical units 730 and 723 is assigned to physical link 958, switch 984, physical link 959, switch 985, and physical link 960. Logical edge 751 that couples logical units 730 and 724 is assigned to physical link 958, switch 984, physical link 959, switch 985, and physical link 961. Logical edge 751 that couples logical units 723 and 725 is assigned to physical link 962, switch 986, and physical link 964. Logical edge 751 that couples logical units 724 and 725 is assigned to physical link 963, switch 987, and physical link 965. Logical edge 752 that couples logical units 725 and 711 is assigned to physical link 966, switch 987, and physical link 967.

Illustratively, the logical edges of the second subgraph of the operation unit graph 700 of FIG. 7 may be assigned to the physical edges and switches of the reconfigurable processor 400 of FIG. 4 as follows: Logical edge 750 that couples logical units 712 and 726 is assigned to physical link 968, switch 988, physical link 970, switch 990, and physical link 972. Logical edge 750 that couples logical units 713 and 727 is assigned to physical link 969, switch 989, physical link 971, switch 991, and physical link 973. The logical edge that couples logical units 726 and 731 is assigned to physical link 974, switch 983, and physical link 976. Logical edge 751 that couples logical units 727 and 731 is assigned to physical link 975, switch 992, and physical link 977. Logical edge 751 that couples logical units 731 and 728 is assigned to physical link 977, switch 984, physical link 959, switch 985, physical link 978, switch 987, and physical link 979. Logical edge 751 that couples logical units 728 and 732 is realized inside physical unit 932 (e.g., using physical connection 423 between PMU 510 and PCU 520 of FIG. 5) and is not assigned to a physical link outside of a physical unit of the reconfigurable processor. Logical edge 751 that couples logical units 732 and 729 is assigned to physical link 940, switch 993, physical link 941, switch 994, and physical link 942. Logical edge 752 that couples logical units 729 and 714 is assigned to physical link 943, switch 995, and physical link 944.

As an example, consider determining the realized bandwidth consumption of the assignment of logical units 710 and 720 of FIG. 7 to physical units 904 and 920 and the assignment of logical edge 750 to physical link 950, switch 980, and physical link 952. Consider further that logical consumer unit 720 is blocking, that the scaling factor of the realized bandwidth is set to 1.0 to speed up the cost estimation, and that the upper output bandwidth limit of the logical producer unit 904 is 1.0, and that the upper input bandwidth limit of the logical consumer unit 920 is 1.0.

Thus, the cost estimation tool may be configured to determine the upper bandwidth limit of the physical links 950 and 951 that implement the logical edge to be 1.0, and the end-to-end bandwidth between the physical producer unit 904 and the physical consumer unit 920 to be 1.0 as well. The capacity of physical links 950 and 952 is 1.0, and the capacity of the physical links is divided equally among all logical edges that share these physical links. Since physical link 952 is not shared with another logical edge, the cost estimation tool may determine the congestion of physical link 952 to be 1.0.

Physical link 950 implements a two-to-one connection between physical unit 904 and physical units 920 and 921. Such a one-to-one connection does not cause congestion even though they overlap and use the same physical link. Thus, the cost estimation tool may be configured to determine that the congestion of physical link 950 is 1.0. The cost estimation tool may further be configured to determine that, the realized bandwidth consumption of the assignment based on the upper bandwidth limit, the end-to-end bandwidth, the scaling factor, and the congestion estimation is 1.0.

As another example, consider determining the realized bandwidth consumption of the assignment of logical units 730 and 723 of FIG. 7 to physical units 930 and 923 and the assignment of logical edge 751 between logical units 730 and 723 to physical link 958, switch 984, physical link 959, switch 985, and physical link 960 under the assumption of the assignment of logical units 731 and 728 of FIG. 7 to physical units 931 and 932 and the assignment of logical edge 751 between logical units 731 and 728 to physical link 977, switch 984, physical link 959, switch 985, physical link 978, switch 987, and physical link 979. Consider further that logical consumer unit 723 is not blocking, that each credit represents one vector, that the scaling factor of the realized bandwidth is set to 1.0 to speed up the cost estimation, that the upper output bandwidth limit of the logical producer unit 930 is 1.0, and that the upper input bandwidth limit of the logical consumer unit 923 is 1.0.

Thus, the cost estimation tool may be configured to determine the upper bandwidth limit of the physical links 958, 959, and 960 that corresponds to the logical edge to be 1.0. The cost estimation tool may further be configured to determine the end-to-end bandwidth between the physical producer unit 930 and the physical consumer unit 923 by determining the number of hops to be two and the maximum Manhattan distance between the physical producer unit 930 and any physical consumer unit 923 to be two. The reconfigurable processor may have a hop-to-hop latency of two and a predetermined barrier latency of five. Thus, the cost estimation tool may determine a first latency based on multiplying the number of hops with the hop-to-hop latency to be four and a second latency based on multiplying the maximum Manhattan distance with the predetermined barrier latency to be 10. In the scenario in which the physical consumer unit 923 has an input FIFO depth of 16, the cost estimation tool may determine the end-to-end bandwidth to be 8/7.

Since the physical link 959 transports first data from physical unit 930 to physical unit 923 and second data that is independent from the first data from physical unit 931 to physical unit 932, the congestion of physical link 956 may be 0.5. In some implementations, the cost estimation tool may be configured to determine the realized bandwidth consumption of the assignment as a product of the scaling factor, the congestion estimation, and the minimum of the upper bandwidth limit and the end-to-end bandwidth. Thus, the cost estimation tool may be configured to determine that the realized bandwidth consumption of the assignment based on the upper bandwidth limit, the end-to-end bandwidth, the scaling factor, and the congestion estimation is 0.5.

Figure 10:
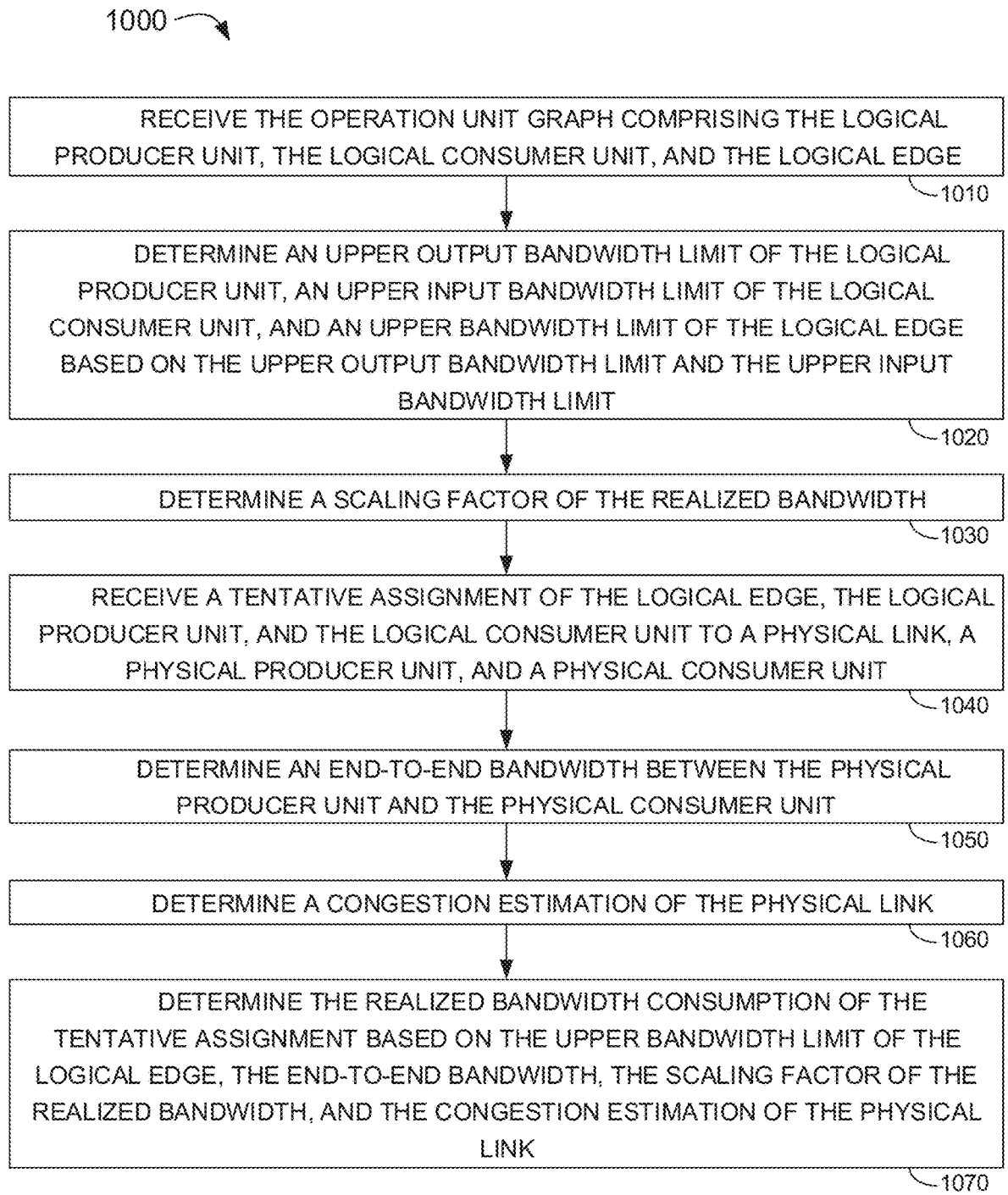
FIG. 10 is a flowchart showing illustrative operations that a cost estimation tool performs for estimating a realized bandwidth consumption of a logical edge between a logical producer unit and a logical consumer unit of an operation unit graph during placement and routing of the logical producer unit, the logical consumer unit, and the logical edge onto a reconfigurable processor.

FIG. 10 is a flowchart 1000 showing illustrative operations that a cost estimation tool performs for estimating a realized bandwidth consumption of a logical edge between a logical producer unit and a logical consumer unit of an operation unit graph during placement and routing of the logical producer unit, the logical consumer unit, and the logical edge onto a reconfigurable processor.

During operation 1010, the cost estimation tool receives the operation unit graph comprising the logical producer unit, the logical consumer unit, and the logical edge. For example, the cost estimation tool 810 of FIG. 8 may receive operation unit graph 805 that includes a logical producer unit, a logical consumer unit, and a logical edge that connects the logical consumer unit with the logical producer unit. For example, logical units 725 and 711 and logical edge 752 between logical units 725 and 711 of operation unit graph 700 of FIG. 7.

During operation 1020, the cost estimation tool determines an upper output bandwidth limit of the logical producer unit, an upper input bandwidth limit of the logical consumer unit, and an upper bandwidth limit of the logical edge based on the upper output bandwidth limit and the upper input bandwidth limit. The upper input bandwidth limit and the upper output bandwidth limit may be determined based on analyzing the data operation that the logical consumer unit and the logical producer unit execute For example, the cost estimation tool 810 of FIG. 8 may determine the upper output bandwidth limit of the logical producer unit 925 of FIG. 9 to be 1.0, the upper input bandwidth limit of the logical consumer unit 906 to be 1.0, and the upper bandwidth limit of logical edge to be 1.0 as well.

During operation 1030, the cost estimation tool determines a scaling factor of the realized bandwidth. As an example, the cost estimation tool 810 of FIG. 8 may determine that the number of active cycles is half the number of stage cycles, thereby determining that the scaling factor is 0.5. As another example, the cost estimation tool 810 of FIG. 8 may determine that the number of active cycles is equal to the number of stage cycles, thereby determining that the scaling factor is 1.0.

During operation 1040, the cost estimation tool receives a tentative assignment of the logical edge, the logical producer unit, and the logical consumer unit to a physical link, a physical producer unit, and a physical consumer unit. For example, the cost estimation tool 810 of FIG. 8 may receive the assignment of logical units 725 and 711 and logical edge 752 between logical units 725 and 711 of operation unit graph 700 of FIG. 7 to physical units 925 and 906 of FIG. 9 respectively, and to physical link 966, switch 987, and physical link 967.

During operation 1050, the cost estimation tool determines an end-to-end bandwidth between the physical producer unit and the physical consumer unit. For example, the cost estimation tool 810 of FIG. 8 may determine that the end-to-end bandwidth is 1.0 based on the observation that the physical consumer unit 906 is blocking.

During operation 1060, the cost estimation tool determines a congestion estimation of the physical link. For example, the cost estimation tool 810 of FIG. 8 may determine that the congestion of the physical links 966 and 967 is 1.0 based on the fact that no other logical unit of the operation unit graph is assigned to physical links 966 and 967.

During operation 1070, the cost estimation tool determines the realized bandwidth consumption of the tentative assignment based on the upper bandwidth limit of the physical link, the end-to-end bandwidth, the scaling factor of the realized bandwidth, and the congestion estimation of the physical link. For example, the cost estimation tool 810 of FIG. 8 may select the minimum of the upper bandwidth limit of the logical edge and the end-to-end bandwidth and multiply the minimum of the upper bandwidth limit and the end-to-end bandwidth with the scaling factor of the logical edge and the congestion estimation of the physical link. In the example above, the cost estimation tool may determine the realized bandwidth consumption of the physical links 966 and 967 between physical units 925 and 906 of FIG. 9 to be 1.0.

If desired, the cost estimation tool may provide the realized bandwidth consumption of the tentative assignment as a cost estimation to a placement and routing tool. For example, the cost estimation tool 810 of FIG. 8 may provide the realized bandwidth consumption of the tentative assignments of units to placer and router 870.

The end-to-end bandwidth may be determined based on whether the physical consumer unit is end-to-end credit-controlled. For example, the producer may only transmit another set of data when the consumer has provided a corresponding credit to the consumer. With such a credit, the consumer communicates to the producer that the consumer is ready to receive and process another set of data. As an example, for determining the end-to-end bandwidth between the physical producer unit and the physical consumer unit, the cost estimation tool may, in response to determining that the physical consumer unit is not end-to-end credit-controlled, determine the end-to-end bandwidth to be 1.0In a scenario in which the bandwidth can have values between 0.0 and 1.0,0.0 means that no bandwidth is available and 1.0 means that 100 percent of the bandwidth is available.

As another example, for determining the end-to-end bandwidth between the physical producer unit and the physical consumer unit, the cost estimation tool may, in response to determining that the physical consumer unit is end-to-end credit-controlled and that each credit represents one vector, determine a number of hops between the physical producer unit and the physical consumer unit, and determine a maximum Manhattan distance between the physical producer unit and the physical consumer unit and between the physical producer unit and any other placed physical consumer unit. In some implementations, the cost estimation tool may determine a first latency based on multiplying the number of hops with a hop-to-hop latency, determine a second latency based on multiplying the maximum Manhattan distance with a predetermined barrier latency, and determine the end-to-end bandwidth between the physical producer unit and the physical consumer unit based on dividing a predetermined first-in first-out buffer depth with a sum of the first and second latencies.

Illustratively, for determining the scaling factor of the realized bandwidth, the cost estimation tool may determine a number of active cycles of the logical edge, determine a number of stage cycles, and determine the scaling factor of the realized bandwidth based on a division of the number of active cycles by the number of stage cycles.

In some implementations, for determining the number of active cycles, the cost estimation tool may determine all paths that pass through the logical edge, determine an accumulated active cycle for each one of all the paths that pass through the logical edge, and determine the number of active cycles as a maximum accumulated active cycle of the accumulated active cycle for each one of all the paths that pass through the logical edge.

Illustratively, for determining the congestion estimation of the physical link, the cost estimation tool may determine all logical edges of the operation unit graph that are assigned to use the physical link, and determine a sum of realized average bandwidths of all the logical edges that are assigned to use the physical link.

If desired, a non-transitory computer-readable storage medium includes instructions that, when executed by a processing unit (e.g., host processor 180 of FIG. 1), cause the processing unit to operate a cost estimation tool (e.g., the cost estimation tool 640 of FIG. 6 or the cost estimation tool 810 of FIG. 8) for estimating a realized bandwidth consumption of a logical edge between a logical producer unit and a logical consumer unit of an operation unit graph during placement and routing of the logical producer unit, the logical consumer unit, and the logical edge onto a reconfigurable processor, by performing operations 1010 to 1060 of FIG. 10.

The instructions may include receiving the operation unit graph comprising the logical producer unit, the logical consumer unit, and the logical edge; determining an upper output bandwidth limit of the logical producer unit, an upper input bandwidth limit of the logical consumer unit, and an upper bandwidth limit of the logical edge based on the upper output bandwidth limit and the upper input bandwidth limit; receiving a tentative assignment of the logical edge, the logical producer unit, and the logical consumer unit to a physical link, a physical producer unit, and a physical consumer unit; determining an end-to-end bandwidth between the physical producer unit and the physical consumer unit; determining a scaling factor of the realized bandwidth; determining a congestion estimation of the physical link; and determining the realized bandwidth consumption of the tentative assignment based on the upper bandwidth limit of the logical edge, the end-to-end bandwidth, the scaling factor of the realized bandwidth, and the congestion estimation of the physical link.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

As will be appreciated by those of ordinary skill in the art, aspects of the presented technology may be embodied as a system, device, method, or computer program product apparatus. Accordingly, elements of the present disclosure may be implemented entirely in hardware, entirely in software (including firmware, resident software, micro-code, or the like) or in software and hardware that may all generally be referred to herein as a "apparatus," "circuit," "circuitry," "module," "computer," "logic," "FPGA," "unit," "system," or other terms.

Furthermore, aspects of the presented technology may take the form of a computer program product embodied in one or more computer-readable medium(s) having computer program code stored thereon. The phrases "computer program code" and "instructions" both explicitly include configuration information for a CGRA, an FPGA, or other programmable logic as well as traditional binary computer instructions, and the term "processor" explicitly includes logic in a CGRA, an FPGA, or other programmable logic configured by the configuration information in addition to a traditional processing core. Furthermore, "executed" instructions explicitly includes electronic circuitry of a CGRA, an FPGA, or other programmable logic performing the functions for which they are configured by configuration information loaded from a storage medium as well as serial or parallel execution of instructions by a traditional processing core.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random-access memory, the data storage in a computer-readable storage medium can be considered to be non-transitory.

A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

Computer program code for carrying out operations for aspects of the present technology may be written in any combination of one or more programming languages, including object-oriented programming languages such as Java, Python, C++, or the like, conventional procedural programming languages, such as the "C" programming language or similar programming languages, or low-level computer languages, such as assembly language or microcode. In addition, the computer program code may be written in VHDL, Verilog, or another hardware description language to generate configuration instructions for an FPGA, CGRA IC, or other programmable logic.

The computer program code if converted into an executable form and loaded onto a computer, FPGA, CGRA IC, or other programmable apparatus, produces a computer implemented method. The instructions which execute on the computer, FPGA, CGRA IC, or other programmable apparatus may provide the mechanism for implementing some or all of the functions/acts specified in the flowchart and/or block diagram block or blocks. In accordance with various implementations, the computer program code may execute entirely on the user's device, partly on the user's device and partly on a remote device, or entirely on the remote device, such as a cloud-based server. In the latter scenario, the remote device may be connected to the user's device through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor, causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So, a processor programmed to perform a task is transformed from what the processor was before being programmed to perform that task, much like a physical plumbing system with different valves can be controlled to change the physical flow of a fluid.

Example 1 is a method of operating a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor, comprising: receiving the operation unit graph comprising the logical producer unit, the logical consumer unit, and the logical edge; determining an upper output bandwidth limit of the logical producer unit, an upper input bandwidth limit of the logical consumer unit, and an upper bandwidth limit of the logical edge based on the upper output bandwidth limit and the upper input bandwidth limit; determining a scaling factor of a realized bandwidth; receiving a tentative assignment of the logical edge, the logical producer unit, and the logical consumer unit to a physical link, a physical producer unit, and a physical consumer unit; determining an end-to-end bandwidth between the physical producer unit and the physical consumer unit; determining a congestion estimation of the physical link; and determining the realized bandwidth consumption of the tentative assignment based on the upper bandwidth limit of the logical edge, the end-to-end bandwidth, the scaling factor of the realized bandwidth, and the congestion estimation of the physical link.

In Example 2, the reconfigurable processor of Example 1 comprises arrays of coarse-grained reconfigurable (CGR) units.

In Example 3, the logical consumer unit of Example 1 comprises a compute unit or a memory unit.

In Example 4, the method of Example 1, further comprises providing the realized bandwidth consumption of the tentative assignment as a cost estimation to a placement and routing tool.

In Example 5, determining the end-to-end bandwidth between the physical producer unit and the physical consumer unit of Example 1 further comprises in response to determining that the physical consumer unit is not end-to-end credit-controlled, determining the end-to-end bandwidth to be 1.0.

In Example 6, determining the end-to-end bandwidth between the physical producer unit and the physical consumer unit of Example 1 further comprises in response to determining that the physical consumer unit is end-to-end credit-controlled and that each credit represents one vector: determining a number of hops between the physical producer unit and the physical consumer unit, and determining a maximum Manhattan distance between the physical producer unit and the physical consumer unit and between the physical producer unit and any other placed physical consumer unit.

In Example 7, determining the end-to-end bandwidth between the physical producer unit and the physical consumer unit of Example 6 further comprises determining a first latency based on multiplying the number of hops with a hop-to-hop latency; and determining a second latency based on multiplying the maximum Manhattan distance with a predetermined barrier latency.

In Example 8, determining the end-to-end bandwidth between the physical producer unit and the physical consumer unit of Example 7 further comprises determining the end-to-end bandwidth between the physical producer unit and the physical consumer unit based on dividing a predetermined first-in first-out buffer depth with a sum of the first and second latencies.

In Example 9, determining the scaling factor of the realized bandwidth of Example 1 further comprises determining a number of active cycles of the logical edge; determining a number of stage cycles; and determining the scaling factor of the realized bandwidth based on a division of the number of active cycles by the number of stage cycles.

In Example 10, determining the number of active cycles of Example 9 further comprises determining all paths that pass through the logical edge; determining an accumulated active cycle for each one of all the paths that pass through the logical edge; and determining the number of active cycles as a maximum accumulated active cycle of the accumulated active cycle for each one of all the paths that pass through the logical edge.

In Example 11, determining the congestion estimation of the physical link of Example 1 further comprises determining all logical edges of the operation unit graph that are assigned to use the physical link.

In Example 12, determining the congestion estimation of the physical link of Example 11 further comprises determining a sum of realized average bandwidths of all the logical edges that are assigned to use the physical link.

Example 13 is a system, comprising a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor, wherein the cost estimation tool is configured to: receive the operation unit graph comprising the logical producer unit, the logical consumer unit, and the logical edge; determine an upper output bandwidth limit of the logical producer unit, an upper input bandwidth limit of the logical consumer unit, and an upper bandwidth limit of the logical edge based on the upper output bandwidth limit and the upper input bandwidth limit; determine a scaling factor of a realized bandwidth; receive a tentative assignment of the logical edge, the logical producer unit, and the logical consumer unit to a physical link, a physical producer unit, and a physical consumer unit; determine an end-to-end bandwidth between the physical producer unit and the physical consumer unit; determine a congestion estimation of the physical link; and determine the realized bandwidth consumption of the tentative assignment based on the upper bandwidth limit of the logical edge, the end-to-end bandwidth, the scaling factor of the realized bandwidth, and the congestion estimation of the physical link.

In Example 14, for determining the end-to-end bandwidth between the physical producer unit and the physical consumer unit, the cost estimation tool of Example 13 is further configured to, in response to determining that the physical consumer unit is end-to-end credit-controlled, determine the end-to-end bandwidth to be 100 percent.

In Example 15, for determining the end-to-end bandwidth between the physical producer unit and the physical consumer unit, the cost estimation tool of Example 13 is further configured to, in response to determining that the physical consumer unit is end-to-end credit-controlled and that each credit represents one vector, determine a number of hops between the physical producer unit and the physical consumer unit, and determine a maximum Manhattan distance between the physical producer unit and the physical consumer unit and between the physical producer unit and any other placed physical consumer unit.

In Example 16, for determining the end-to-end bandwidth between the physical producer unit and the physical consumer unit, the cost estimation tool of Example 15 is further configured to: determine a first latency based on multiplying the number of hops with a hop-to-hop latency; determine a second latency based on multiplying the maximum Manhattan distance with a predetermined barrier latency; and determine the end-to-end bandwidth between the physical producer unit and the physical consumer unit based on dividing a predetermined first-in first-out buffer depth with a sum of the first and second latencies.

In Example 17, for determining the scaling factor of the realized bandwidth, the cost estimation tool of Example 13 is further configured to: determine a number of active cycles of the logical edge; determine a number of stage cycles; and determine the scaling factor of the realized bandwidth based on a division of the number of active cycles by the number of stage cycles.

In Example 18, for determining the number of active cycles, the cost estimation tool of Example 17 is further configured to: determine all paths that pass through the logical edge; determine an accumulated active cycle for each one of all the paths that pass through the logical edge; and determine the number of active cycles as a maximum accumulated active cycle of the accumulated active cycle for each one of all the paths that pass through the logical edge.

In Example 19, for determining the congestion estimation of the physical link, the cost estimation tool of Example 13 is further configured to: determine all logical edges of the operation unit graph that are assigned to use the physical link; and determine a sum of realized average bandwidths of all the logical edges that are assigned to use the physical link.

Example 20 is a non-transitory computer-readable storage medium including instructions that, when executed by a processing unit, cause the processing unit to operate a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor, the instructions comprising receiving the operation unit graph comprising the logical producer unit, the logical consumer unit, and the logical edge; determining an upper output bandwidth limit of the logical producer unit, an upper input bandwidth limit of the logical consumer unit, and an upper bandwidth limit of the logical edge based on the upper output bandwidth limit and the upper input bandwidth limit; determining a scaling factor of a realized bandwidth; receiving a tentative assignment of the logical edge, the logical producer unit, and the logical consumer unit to a physical link, a physical producer unit, and a physical consumer unit; determining an end-to-end bandwidth between the physical producer unit and the physical consumer unit; determining a congestion estimation of the physical link; and determining the realized bandwidth consumption of the tentative assignment based on the upper bandwidth limit of the logical edge, the end-to-end bandwidth, the scaling factor of the realized bandwidth, and the congestion estimation of the physical link.

What is claimed is:

1. A method of operating a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor, comprising:
    receiving the operation unit graph comprising the logical producer unit, the logical consumer unit, and the logical edge;
    determining an upper output bandwidth limit of the logical producer unit, an upper input bandwidth limit of the logical consumer unit, and an upper bandwidth limit of the logical edge based on the upper output bandwidth limit and the upper input bandwidth limit;
    determining a scaling factor of a realized bandwidth;
    receiving a tentative assignment of the logical edge, the logical producer unit, and the logical consumer unit to a physical link, a physical producer unit, and a physical consumer unit;
    determining an end-to-end bandwidth between the physical producer unit and the physical consumer unit;
    determining a congestion estimation of the physical link;
    determining the realized bandwidth consumption of the tentative assignment based on the upper bandwidth limit of the logical edge, the end-to-end bandwidth, the scaling factor of the realized bandwidth, and the congestion estimation of the physical link; and
    providing the realized bandwidth consumption of the tentative assignment as a cost estimation to a placement and routing tool.

2. The method of claim 1, wherein the reconfigurable processor comprises arrays of coarse-grained reconfigurable (CGR) units.

3. The method of claim 1, wherein the logical consumer unit comprises a compute unit or a memory unit.

4. The method of claim 1, wherein determining the end-to-end bandwidth between the physical producer unit and the physical consumer unit further comprises:
    in response to determining that the physical consumer unit is not end-to-end credit-controlled, determining the end-to-end bandwidth to be 1.0.

5. The method of claim 1, wherein determining the end-to-end bandwidth between the physical producer unit and the physical consumer unit further comprises:
    in response to determining that the physical consumer unit is end-to-end credit-controlled and that each credit represents one vector:
    determining a number of hops between the physical producer unit and the physical consumer unit, and
    determining a maximum Manhattan distance between the physical producer unit and the physical consumer unit and between the physical producer unit and any other placed physical consumer unit.

6. The method of claim 5, wherein determining the end-to-end bandwidth between the physical producer unit and the physical consumer unit further comprises:

determining a first latency based on multiplying the number of hops with a hop-to-hop latency; and determining a second latency based on multiplying the maximum Manhattan distance with a predetermined barrier latency.

7. The method of claim 6, wherein determining the end-to-end bandwidth between the physical producer unit and the physical consumer unit further comprises:

determining the end-to-end bandwidth between the physical producer unit and the physical consumer unit based on dividing a predetermined first-in first-out buffer depth with a sum of the first and second latencies.

8. The method of claim 1, wherein determining the scaling factor of the realized bandwidth further comprises:

determining a number of active cycles of the logical edge;

determining a number of stage cycles; and determining the scaling factor of the realized bandwidth based on a division of the number of active cycles by the number of stage cycles.

9. The method of claim 8, wherein determining the number of active cycles further comprises:

determining all paths that pass through the logical edge;

determining an accumulated active cycle for each one of all the paths that pass through the logical edge; and determining the number of active cycles as a maximum accumulated active cycle of the accumulated active cycle for each one of all the paths that pass through the logical edge.

10. The method of claim 1, wherein determining the congestion estimation of the physical link further comprises:

determining all logical edges of the operation unit graph that are assigned to use the physical link.

11. The method of claim 10, wherein determining the congestion estimation of the physical link further comprises:

determining a sum of realized average bandwidths of all the logical edges that are assigned to use the physical link.

12. A system, comprising:

a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor, wherein the cost estimation tool is configured to:

receive the operation unit graph comprising the logical producer unit, the logical consumer unit, and the logical edge;

determine an upper output bandwidth limit of the logical producer unit, an upper input bandwidth limit of the logical consumer unit, and an upper bandwidth limit of the logical edge based on the upper output bandwidth limit and the upper input bandwidth limit;

determine a scaling factor of a realized bandwidth;

receive a tentative assignment of the logical edge, the logical producer unit, and the logical consumer unit to a physical link, a physical producer unit, and a physical consumer unit;

determine an end-to-end bandwidth between the physical producer unit and the physical consumer unit;

determine a congestion estimation of the physical link;

determine the realized bandwidth consumption of the tentative assignment based on the upper bandwidth limit of the logical edge, the end-to-end bandwidth, the scaling factor of the realized bandwidth, and the congestion estimation of the physical link; and provide the realized bandwidth consumption of the tentative assignment as a cost estimation to a placement and routing tool.

13. The system of claim 12, wherein, for determining the end-to-end bandwidth between the physical producer unit and the physical consumer unit, the cost estimation tool is further configured to:

in response to determining that the physical consumer unit is end-to-end credit-controlled, determine the end-to-end bandwidth to be 100 percent.

14. The system of claim 12, wherein, for determining the end-to-end bandwidth between the physical producer unit and the physical consumer unit, the cost estimation tool is further configured to:

in response to determining that the physical consumer unit is end-to-end credit-controlled and that each credit represents one vector:

determine a number of hops between the physical producer unit and the physical consumer unit, and determine a maximum Manhattan distance between the physical producer unit and the physical consumer unit and between the physical producer unit and any other placed physical consumer unit.

15. The system of claim 14, wherein, for determining the end-to-end bandwidth between the physical producer unit and the physical consumer unit, the cost estimation tool is further configured to:

determine a first latency based on multiplying the number of hops with a hop-to-hop latency;

determine a second latency based on multiplying the maximum Manhattan distance with a predetermined barrier latency; and determine the end-to-end bandwidth between the physical producer unit and the physical consumer unit based on dividing a predetermined first-in first-out buffer depth with a sum of the first and second latencies.

16. The system of claim 12, wherein, for determining the scaling factor of the realized bandwidth, the cost estimation tool is further configured to:

determine a number of active cycles of the logical edge;

determine a number of stage cycles; and determine the scaling factor of the realized bandwidth based on a division of the number of active cycles by the number of stage cycles.

17. The system of claim 16, wherein, for determining the number of active cycles, the cost estimation tool is further configured to:

determine all paths that pass through the logical edge;

determine an accumulated active cycle for each one of all the paths that pass through the logical edge; and determine the number of active cycles as a maximum accumulated active cycle of the accumulated active cycle for each one of all the paths that pass through the logical edge.

18. The system of claim 12, wherein, for determining the congestion estimation of the physical link, the cost estimation tool is further configured to:

determine all logical edges of the operation unit graph that are assigned to use the physical link; and determine a sum of realized average bandwidths of all the logical edges that are assigned to use the physical link.

19. A non-transitory computer-readable storage medium including instructions that, when executed by a processing unit, cause the processing unit to operate a cost estimation tool for estimating a realized bandwidth consumption of a logical edge between a logical producer unit and a logical consumer unit of an operation unit graph during placement and routing of the logical producer unit, the logical consumer unit, and the logical edge onto a reconfigurable processor, the instructions comprising:
- receiving the operation unit graph comprising the logical producer unit, the logical consumer unit, and the logical edge;
- determining an upper output bandwidth limit of the logical producer unit, an upper input bandwidth limit of the logical consumer unit, and an upper bandwidth limit of the logical edge based on the upper output bandwidth limit and the upper input bandwidth limit;
- determining a scaling factor of a realized bandwidth;
- receiving a tentative assignment of the logical edge, the logical producer unit, and the logical consumer unit to a physical link, a physical producer unit, and a physical consumer unit;
- determining an end-to-end bandwidth between the physical producer unit and the physical consumer unit;
- determining a congestion estimation of the physical link;
- determining the realized bandwidth consumption of the tentative assignment based on the upper bandwidth limit of the logical edge, the end-to-end bandwidth, the scaling factor of the realized bandwidth, and the congestion estimation of the physical link
- providing the realized bandwidth consumption of the tentative assignment as a cost estimation to a placement and routing tool.

* * * * *